United States Patent
Uchida

(10) Patent No.: US 10,154,073 B2
(45) Date of Patent: Dec. 11, 2018

(54) PACKET FORWARDING APPARATUS FOR HANDLING MULTICAST PACKET

(71) Applicant: NEC Corporation, Minato-ku, Tokyo (JP)

(72) Inventor: Satoshi Uchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 110 days.

(21) Appl. No.: 15/110,853

(22) PCT Filed: Jan. 15, 2015

(86) PCT No.: PCT/JP2015/050937
§ 371 (c)(1),
(2) Date: Jul. 11, 2016

(87) PCT Pub. No.: WO2015/108106
PCT Pub. Date: Jul. 23, 2015

(65) Prior Publication Data
US 2016/0337423 A1    Nov. 17, 2016

(30) Foreign Application Priority Data
Jan. 16, 2014  (JP) .................. 2014-005637

(51) Int. Cl.
*H04L 29/06*  (2006.01)
*H04L 12/46*  (2006.01)
(Continued)

(52) U.S. Cl.
CPC ...... *H04L 65/4076* (2013.01); *H04L 12/1886* (2013.01); *H04L 12/4633* (2013.01); *H04L 45/586* (2013.01); *H04L 45/74* (2013.01)

(58) Field of Classification Search
None
See application file for complete search history.

(56) References Cited

U.S. PATENT DOCUMENTS 7,830,825 B2 * 11/2010 Fu ..................... H04L 12/185
                                                  370/312
7,894,428 B2    2/2011 Yamane
(Continued)

FOREIGN PATENT DOCUMENTS

EP      2288076 A1    2/2011
JP    H11-127200 A    5/1999
(Continued)

OTHER PUBLICATIONS

Nakagawa et al: "A Management Method of IP Multicast in Overlay Networks using OpenFlow" Hot Topics in Software Defined Networks. Aug. 13, 2012. pp. 91-96.
(Continued)

*Primary Examiner* — Anh Ngoc M Nguyen

(57) ABSTRACT

A packet forwarding apparatus includes: a multicast determination unit that determines whether a packet that flows through a virtual network is a multicast communication packet; a multicast mapping information storage unit; a multicast mapping unit that allocates a second multicast address to a first multicast address of a newly generated multicast communication and manages these multicast addresses as a piece of mapping information; and a packet encapsulation unit that encapsulates the packet that flows through the virtual network. The packet encapsulation unit encapsulates the multicast communication packet that flows through the virtual network by using the second multicast address.

13 Claims, 38 Drawing Sheets

(51) Int. Cl.
*H04L 12/713* (2013.01)
*H04L 12/741* (2013.01)
*H04L 12/18* (2006.01)

(56) References Cited

U.S. PATENT DOCUMENTS

| | | | |
|---|---|---|---|
| 8,576,844 B1 | 11/2013 | Ghosh | |
| 2005/0027782 A1 | 2/2005 | Jalan et al. | |
| 2008/0002727 A1 | 1/2008 | Yamane | |
| 2011/0286470 A1* | 11/2011 | Dec | H04L 12/1836 370/467 |
| 2013/0227108 A1* | 8/2013 | Dunbar | H04L 12/4633 709/223 |
| 2013/0322453 A1 | 12/2013 | Allan | |
| 2014/0003427 A1 | 1/2014 | Nishi et al. | |
| 2014/0192804 A1* | 7/2014 | Ghanwani | H04L 49/70 370/390 |

FOREIGN PATENT DOCUMENTS

| | | |
|---|---|---|
| JP | 2012-191518 A | 10/2012 |
| JP | 2013-528340 A | 7/2013 |
| JP | 2014-007681 A | 1/2014 |
| WO | 2006/095391 A1 | 9/2006 |
| WO | 2013/140507 A1 | 9/2013 |

OTHER PUBLICATIONS

Extended European Search Report for EP Application No. EP15737821.7 dated Sep. 13, 2017.

M. Mahalingam, and seven others, "VXLAN: A Framework for Overlaying Virtualized Layer 2 Networks over Layer 3 Network," [online], [searched on Nov. 11, 2013], Internet URL:http://tools.ietf.org/pdf/draft-mahalingam-dutt-dcops-vxlan-02.pdf.

M. Sridharan, and nine others, "NVGRE: Network Virtualization using Generic Routing Encapsulation," [online], [searched on Nov. 11, 2013], Internet URL:http://tools.ietf.org/pdf/draft-sridharan-virtualization-nvgre-01.pdf.

Nick McKeown, and seven others, "OpenFlow: Enabling Innovation in Campus Networks," [online], [searched on Nov. 11, 2013], Internet <URL: http://www.openflow.org/documents/openflow-wp-latest.pdf>.

International Search Report for PCT Application No. PCT/JP2015/050937, dated Mar. 17, 2015.

Yusuke Nishi et al., "Centralized Multicast Tree Control for rapid VXLAN path failover", IEICE Technical Report vol. 112, No. 134, The Institute of Electronics Information and Communication Engineers, Jul. 19-20, 2012, Japan, English Abstract, cited in Japanese Office Action.

Japanese Office Action for JP Application No. 2015-557866 dated May 23, 2017 with English Translation.

Japanese Office Action for JP Application No. 2017-171764 dated Jul. 31, 2018 with English Translation.

\* cited by examiner

FIG. 3

| VIRTUAL-NETWORK-SIDE MULTICAST ADDRESS | SUBSTRATE-NETWORK-SIDE MULTICAST ADDRESS |
|---|---|
| 225.0.0.1 | 238.0.0.1 |
| 226.0.0.1 | 238.0.0.2 |
| NOT ALLOCATED YET | 238.0.0.3 |
| . . | . . |

FIG. 19

| VIRTUAL-NETWORK-SIDE MULTICAST ADDRESS | SUBSTRATE-NETWORK-SIDE MULTICAST ADDRESS | MEMBER |
|---|---|---|
| 225.0.0.1 | 238.0.0.1 | 401, 402, ··· |
| 226.0.0.1 | 238.0.0.2 | 401, 403, ··· |
| NOT ALLOCATED YET | 238.0.0.3 | |
| ··· | ··· | ··· |

PACKET FORWARDING APPARATUS FOR HANDLING MULTICAST PACKET

REFERENCE TO RELATED APPLICATION

The present invention is a National Stage Entry of PCT/JP2015/050937 filed Jan. 15, 2015, which is based upon and claims the benefit of the priority of Japanese patent application No. 2014-005637, filed on Jan. 16, 2014, the disclosures of all which are incorporated herein in their entirety by reference thereto.

FIELD

The present invention relates to a packet forwarding apparatus, a control apparatus, a communication system, a communication method, and a program. In particular, it relates to a packet forwarding apparatus, a control apparatus, a communication system, a communication method, and a program that handle multicast packets on virtual networks configured on a substrate network.

BACKGROUND

In recent years, large-scale data center environments or virtual machine environments thereon have increasingly been used. With this increase, SDNs (Software-Defined Networks) have been configured on such virtual machine environments. In such cases, since a VLAN (Virtual Local Area Network) or the like has problems that partitioning resources of network apparatuses are small and settings of network nodes are complex, an overlay network technique for configuring an edge overlay network is used.

Examples of the edge overlay network technique include tunneling techniques such as a VXLAN (Virtual eXtensible Local Area Network) and NVGRE (Network Virtualization using Generic Routing Encapsulation) is used (see Non Patent Literatures (NPLs) 1 and 2). In these techniques, communications on a virtual network configured on virtual machines are encapsulated and forwarded to a substrate network (physical network) configured by network nodes configuring the virtual machine environment. In these tunneling techniques, it is possible to virtually increase the virtual-network partitioning resources by adding virtual network IDs when encapsulation is performed. In addition, in these tunneling techniques, burden required for settings of network nodes is reduced by using communications on the substrate network.

However, in these tunneling techniques, processing about broadcast, multicast, and unknown unicast is not specifically defined. It is only defined that an IP (Internet Protocol) multicast technique on the substrate network is used. While an IP multicast address could be shared, an IP multicast address is normally set per virtual network ID, and forwarding is achieved throughout the network of the virtual machine environment configured, namely, throughout the target virtual network (see "4.2. Broadcast Communication and Mapping to Multicast" in NPL 1 and "4.1. Broadcast and Multicast Traffic" in NPL 2).

PTL 1 discloses a switch that encapsulates a packet by using a header called a TRILL (Transparent Interconnection of Lots of Links) header. According to Patent Literature (PTL) 1, this switch comprises: a determining mechanism configured to determine an internal multicast group identifier based on a source address, a multicast address, and a multicast tree identifier field associated with a multicast packet; and a forwarding mechanism configured to forward the multicast packet based on the internal multicast group identifier.

NPL 3 is a white paper on a network control technique called OpenFlow. By using OpenFlow, an OpenFlow switch is allowed to function as a TEP apparatus in a tunneling technique.

PTL 1: Japanese Patent Kohyo Publication No. 2013-528340A

NPL 1: M. Mahalingam, and seven others, "VXLAN: A Framework for Overlaying Virtualized Layer 2 Networks over Layer 3 Network," [online], [searched on Nov. 11, 2013], Internet <URL:http://tools.ietf.org/pdf/draft-mahalingam-dutt-dcops-vxlan-02.pdf>

NPL 2: M. Sridharan, and nine others, "NVGRE: Network Virtualization using Generic Routing Encapsulation," [online], [searched on Nov. 11, 2013], Internet <URL:http://tools.ietf.org/pdf/draft-sridharan-virtualization-nvgre-01.pdf>

NPL 3: Nick McKeown, and seven others, "OpenFlow: Enabling Innovation in Campus Networks," [online], [searched on November 11,], Internet <URL: http://www.openflow.org/documents/openflow-wp-latest.pdf>

SUMMARY

The following analysis has been made by the present inventor. FIG. 37 illustrates an example of configuring virtual networks. Assuming that a streaming server 111 (Video VM 1) and a client terminal 112 (Client VM 1) belong to a single virtual network, TEP (Tunnel End Point) apparatuses 101 and 102 in virtual switches (not illustrated) serving as packet forwarding apparatuses (not illustrated) on the virtual network use a tunneling technique to perform encapsulation and decapsulation. In this way, the virtual network is separated from the substrate network.

Assuming that the virtual network ID (corresponding to "VNI" of the VXLAN and "TNI" of the NVGRE) of the virtual network to which the streaming server 111 (Video VM 1) and the client terminal 112 (Client VM 1) belong is 1, an IP multicast address (239.0.0.1 in the example in FIG. 37) is set for the virtual network ID=1, and the TEP apparatus 102 and the TEP apparatus 101 that belong to the virtual network ID configure a multicast network on the substrate network. Subsequently, broadcast, multicast, and unknown unicast performed by any one of the terminals that belong to the virtual network ID=1 is communicated by using this IP multicast address 239.0.0.1 on the substrate network.

Likewise, assuming that a streaming server 121 (Video VM 2) and a client terminal 122 (Client VM 2) belong to another virtual network 110 whose virtual network ID is 2, an IP multicast address (239.0.0.2 in the example in FIG. 37) is set for the virtual network ID=2, and the TEP apparatus 102 and a TEP apparatus 103 that belong to the virtual network ID configure a multicast network on the substrate network.

These IP multicast addresses need to be set in advance in each of the TEP apparatuses or from an external setting control apparatus when an individual one of the virtual networks is configured. Alternatively, if the above division is not explicitly made, the same multicast address may be used. For example, while 239.0.0.2 is used for the virtual network ID=2 in the example in FIG. 37, 239.0.0.1 set for the virtual network ID=1 may be used for the virtual network ID=2. In this case, since all the TEP apparatuses 101 to 103 use the same IP multicast address 239.0.0.1, a multicast communication performed on the substrate network is communicated to all the TEP apparatuses. Before an individual TEP apparatus decapsulates and forwards a packet to a corresponding virtual network, the TEP apparatus recognizes the packet by using the corresponding virtual network ID. In this way, the TEP apparatus can determine whether to forward the packet to the inside (to the VM side).

When a plurality of multicast communications are handled within a virtual network as described above, the original communication ranges of these multicast communications are different. However, as described above, when a multicast communication is performed on the substrate network, there are cases in which the communication is forwarded throughout a virtual network. In such cases, a multicast communication in a virtual network uses, irrespective of its multicast region, all the lines of the substrate network to which the virtual network belongs. This deteriorates the line utilization efficiency of the multicast.

The problem with the above system will be described from a different perspective with reference to FIG. 38. FIG. 38 will be described assuming that virtual networks having the same network ID are set to all terminals. In this state, a client terminal 212 (Client VM 1-1) and a client terminal 213 (Client VM 1-2) perform a multicast communication on their virtual network since these terminals wish to receive streaming data from a streaming server 211 (Video VM 1). Likewise, a client terminal 222 (Client VM 2-1) and a client terminal 223 (Client VM 2-2) perform a multicast communication on their virtual network since these terminals wish to receive streaming data from a streaming server 221 (Video VM 2). In this case, while it is only sufficient that the multicast communication transmitted from the streaming server 211 flows to a TEP apparatus 202 through a TEP apparatus 201, since the same virtual network is established, the multicast communication is also transmitted to a TEP apparatus 203. Subsequently, since the terminals ahead of the TEP apparatus 203, which are the client terminal 222 (Client VM 2-1) and the client terminal 223 (Client VM 2-2) in this example, denies receiving the multicast communication, the correct terminals receive the multicast communication. However, as illustrated in FIG. 38, the line between a router 200 and the TEP apparatus 203 or the network resources ahead thereof is unnecessarily used.

Paragraph 0139 in PTL 1 also discloses this deterioration of the utilization efficiency of network resources by multicast. However, PTL 1 only discloses filtering multicast packets based on IVNIDs (internal virtual network IDs). Namely, PTL 1 does not disclose any mechanism of how IVNIDs (internal virtual network IDs) need to be set or dynamically shared among switches.

It is an object of the present invention to provide a packet forwarding apparatus, a control apparatus, a communication system, a communication method, and a program that require less labor for previously setting IP multicast addresses for performing multicast communications on virtual networks and that contribute to improvement of the communication utilization efficiency of the substrate network.

According to a first aspect, there is provided a certain packet forwarding apparatus. This packet forwarding apparatus includes a multicast determination unit that determines whether a packet(s) that flows through a virtual network obtained by logically dividing a substrate network is a multicast communication packet(s). The packet forwarding apparatus also includes a multicast mapping information storage unit that holds a piece(s) of mapping information, each of which includes a first multicast address used in a virtual network obtained by logically dividing the substrate network and a second multicast address used from a multicast address usable in the substrate network, the first and second multicast addresses being associated with each other. The packet forwarding apparatus also includes a multicast mapping unit that allocates a second multicast address to a first multicast address of a newly generated multicast communication and manages these multicast addresses as a piece of mapping information. The packet forwarding apparatus also includes a packet encapsulation unit that encapsulates the packet(s) that flows through the virtual network so that the encapsulated packet(s) reaches a correspondence packet forwarding apparatus(es) via the substrate network. The packet encapsulation unit encapsulates a multicast communication packet(s) that flows through a virtual network by using a second multicast address associated with a first multicast address.

According to a second aspect, there is provided a control apparatus that realizes functions of the above packet forwarding apparatus by setting control information in the above packet forwarding apparatus.

According to a third aspect, there is provided a communication system including: a substrate network in which a router having a multicast function is arranged; the above packet forwarding apparatus; and a server(s) that provides a virtual machine(s) that performs a communication(s) via the substrate network and the above packet forwarding apparatus.

According to a fourth aspect, there is provided a communication method, including steps of: causing a packet forwarding apparatus that performs a communication by encapsulating a packet(s) that flows through a virtual network obtained by logically dividing a substrate network so that the encapsulated packet(s) reaches a correspondence packet forwarding apparatus(es) via the substrate network to determine whether the packet(s) that flows through the virtual network is a multicast communication packet(s); causing, regarding the multicast communication in the virtual network, the packet forwarding apparatus to allocate a second multicast address used to a first multicast address used in the virtual network obtained by logically dividing the substrate network from a multicast address usable in the substrate network and manage these multicast addresses in a multicast mapping information storage unit that holds the first and second multicast addresses that are associated with each other as a piece of mapping information; and causing, regarding the multicast communication in the virtual network, the packet forwarding apparatus to perform encapsulation by using the second multicast address associated with the first multicast address. The present method is tied to a certain machine, which is a packet forwarding apparatus that processes a packet(s) that flows through a virtual network obtained by logically dividing a physical network including a substrate network.

According to a fifth aspect, there is provided a computer-readable storage medium storing a program, causing a computer included in a packet forwarding apparatus that performs a communication by encapsulating a packet(s) that flows through a virtual network obtained by logically dividing a substrate network so that the encapsulated packet(s) reaches a correspondence packet forwarding apparatus(es) via the substrate network to perform processing for: determining whether the packet(s) that flows through the virtual network is a multicast communication packet(s); allocating, regarding the multicast communication in the virtual network, a second multicast address used to a first multicast address used in the virtual network obtained by logically dividing the substrate network from a multicast address usable in the substrate network and managing these multicast addresses in a multicast mapping information storage unit that holds the first and second multicast addresses that are associated with each other as a piece of mapping information; and performing, regarding a packet(s) in the multicast communication in the virtual network, encapsulation by using the second multicast address associated with the first multicast address. The program can be recorded in a computer-readable (non-transitory) storage medium. Namely, the present invention can be embodied as a computer program product.

Each element in the packet forwarding apparatus, the control apparatus, the communication system, the communication method, and the program contributes to solving the above problem.

The meritorious effects of the present invention are summarized as follows.

The present invention requires less labor for previously setting IP multicast addresses for performing multicast communications on virtual networks and contributes to improvement of the communication utilization efficiency of the substrate network.

BRIEF DESCRIPTION OF DRAWINGS

FIG. 3 illustrates an example of mapping information held in the packet forwarding apparatus according to the first exemplary embodiment of the present invention.

FIG. 19 illustrates an example of mapping information held in the multicast mapping management apparatus according to the second exemplary embodiment of the present invention.

PREFERRED MODES

Figure 1:
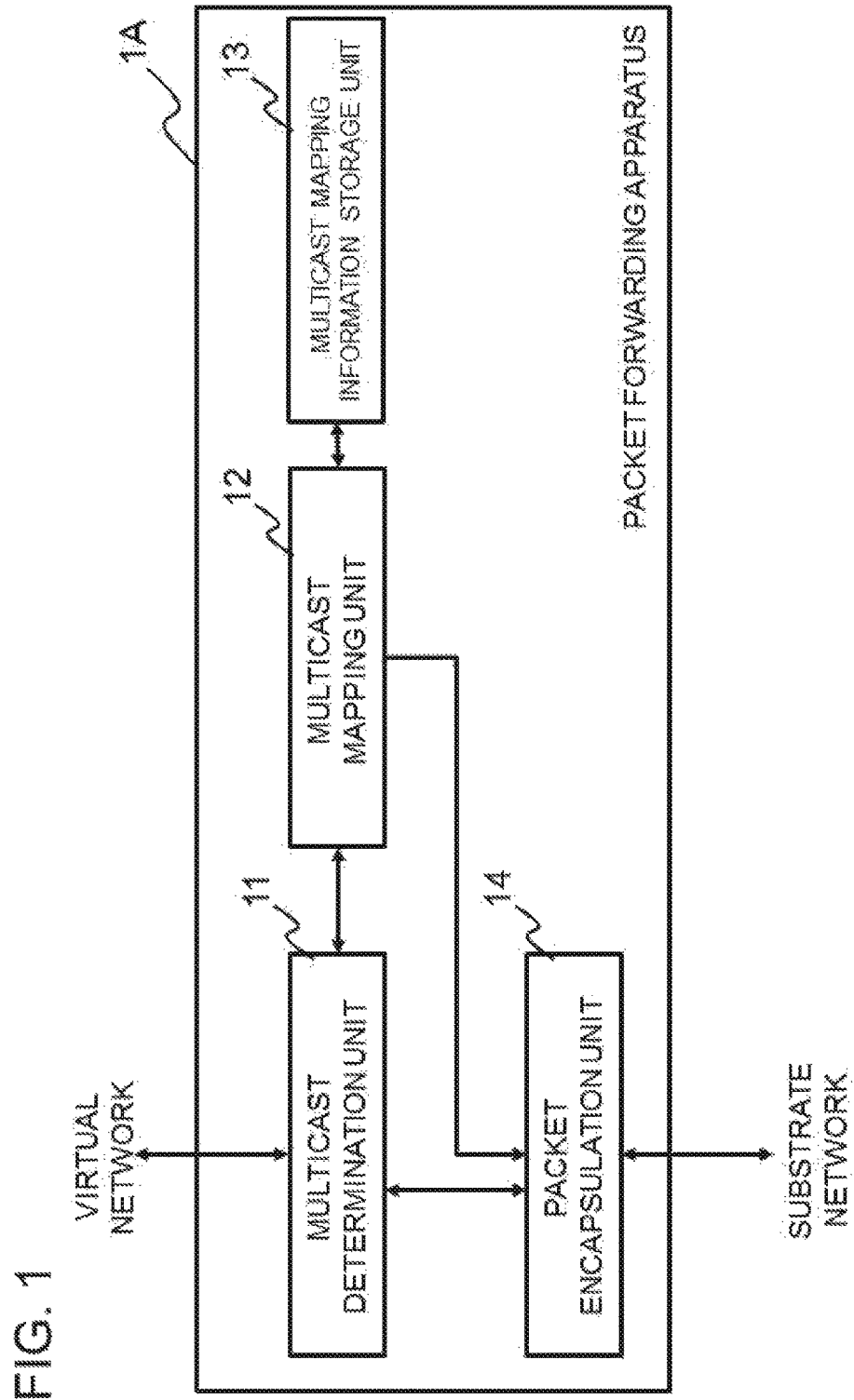
FIG. 1 illustrates a configuration according to an exemplary embodiment of the present invention.

First, an outline of an embodiment of the present invention will be described. In the following outline, various components are denoted by reference characters for the sake of convenience. Namely, the following reference characters are merely used as examples to facilitate understanding of the present invention, not to limit the present invention to the illustrated modes.

As illustrated in FIG. 1, an embodiment of the present invention can be realized by a packet forwarding apparatus 1A including: a multicast determination unit 11 that determines whether a packet(s) that flows through a virtual network obtained by logically dividing a physical network including a substrate network is a multicast communication packet(s); a multicast mapping information storage unit 13 that holds a piece(s) of correspondence information, each of which includes a first multicast address used in a virtual network obtained by logically dividing the substrate network and a second multicast address used from a multicast address usable in the substrate network, the first and second multicast addresses being associated with each other; a multicast mapping unit 12 that allocates a second multicast address to a first multicast address of a newly generated multicast communication and manages these multicast addresses; and a packet encapsulation unit that encapsulates the packet(s) that flows through the virtual network so that the encapsulated packet(s) reaches a correspondence packet forwarding apparatus(es) via the substrate network.

Based on instructions from the multicast determination unit 11 and the multicast mapping unit 12, the packet encapsulation unit 14 encapsulates the multicast communication packet(s) that flows through the virtual network by using a second multicast address associated with a first multicast address. In this way, when a multicast communication flows from a virtual network to the substrate network, the multicast communication is encapsulated with the corresponding second multicast address. In the substrate network, group management and forwarding based thereon are performed by using an existing group management protocol based on the encapsulated second multicast address, for example. Thus, multicast packets can be forwarded to an appropriate range without making previous settings, and the communication use efficiency of the substrate network can be improved.

FIRST EXEMPLARY EMBODIMENT

Figure 2:
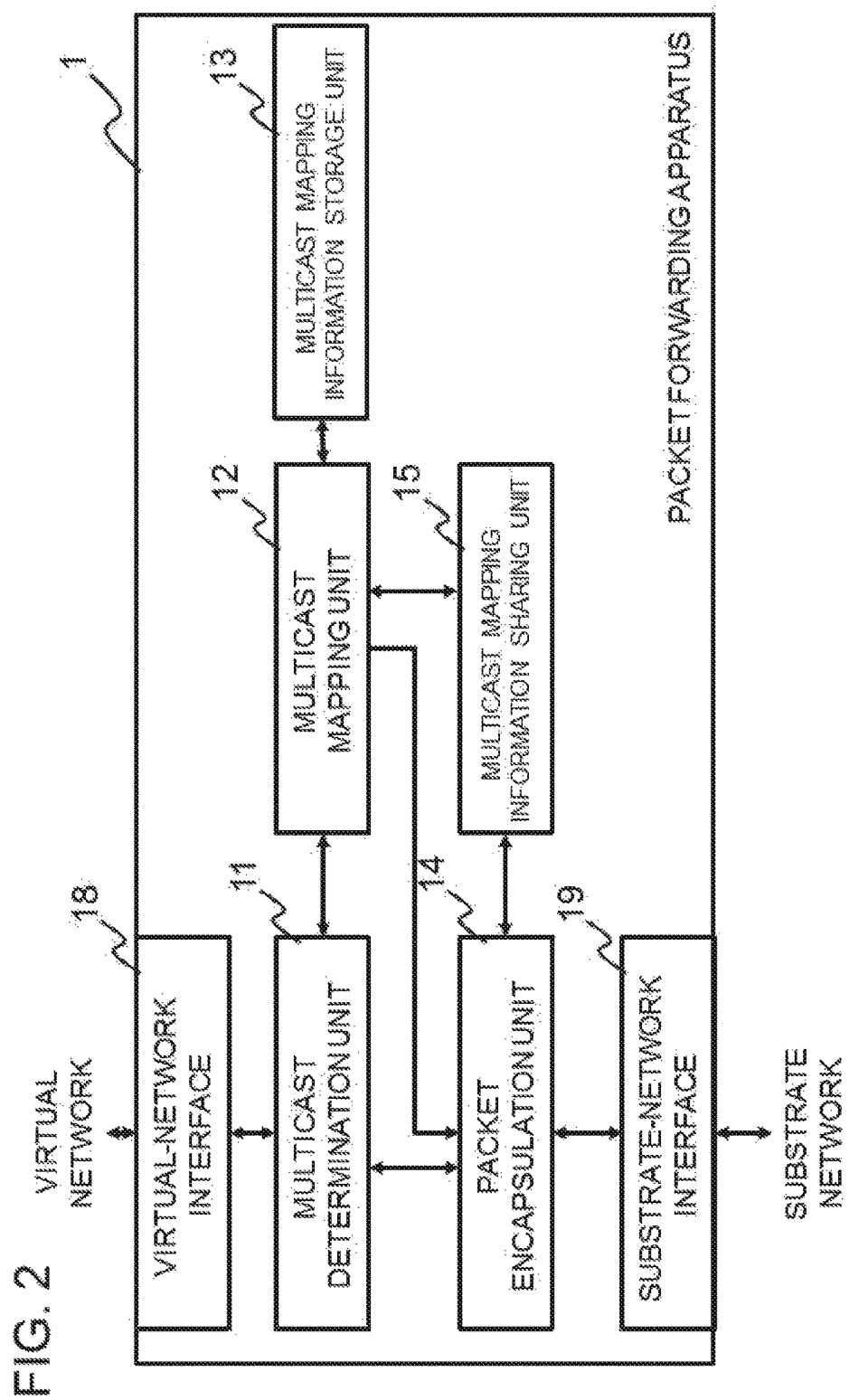
FIG. 2 illustrates a configuration of a packet forwarding apparatus according to a first exemplary embodiment of the present invention.

Next, a first exemplary embodiment of the present invention will be described in detail with reference to the drawings. FIG. 2 illustrates a configuration of a packet forwarding apparatus according to the first exemplary embodiment of the present invention. As illustrated in FIG. 2, the packet forwarding apparatus includes a multicast determination unit 11, a multicast mapping unit 12, a multicast mapping information storage unit 13, a multicast mapping information sharing unit 15, a packet encapsulation unit 14, a virtual-network interface 18 that transmits and receives communication packets to and from a virtual network, and a substrate-network interface 19 that transmits and receives communication packets to and from a substrate network.

When receiving a communication packet from the virtual-network interface 18, the multicast determination unit 11 determines whether the communication packet is a multicast packet or a multicast control message. If the communication packet received from the virtual-network interface 18 is a multicast packet or a multicast control message, the multicast determination unit 11 transmits information about the multicast packet to the multicast mapping unit 12 and requests the multicast mapping unit 12 to perform mapping processing. If the multicast packet address is a special-purpose address such as an all-host multicast domain address (224.0.0.1 in IP version 4), the multicast determination unit 11 handles the communication packet in the same way as it handles broadcast. Namely, the multicast determination unit 11 does not request the multicast mapping unit 12 to perform mapping processing. If the multicast determination unit 11 determines that the packet is not a multicast packet or a multicast control message, the multicast determination unit 11 forwards the packet to the packet encapsulation unit 14.

If the multicast mapping unit 12 is requested to perform mapping processing on a multicast packet, the multicast mapping unit 12 refers to the multicast mapping information storage unit 13 and extracts or determines a substrate-network multicast address (second multicast address) corresponding to the multicast packet address (first multicast address).

If the multicast mapping unit 12 has extracted a substrate-network multicast address (second multicast address) by referring to the multicast mapping information storage unit 13, the multicast mapping unit 12 requests the packet encapsulation unit 14 to perform encapsulation with the extracted substrate-network multicast address (second multicast address).

If the multicast mapping unit 12 cannot extract a substrate-network multicast address, namely, if the multicast address is the above all-host multicast domain address (224.0.0.1 in IP version 4), the multicast mapping unit 12 requests the packet encapsulation unit 14 to perform encapsulation with a substrate-network multicast address set when the corresponding virtual network is configured.

In addition, if the multicast mapping unit 12 is requested by the multicast determination unit 11 or the packet encapsulation unit 14 to perform mapping on a multicast control message, the multicast mapping unit 12 processes the multicast control message as follows, depending on the kind of the message.

First, if the multicast mapping unit 12 is requested to perform mapping processing on a multicast group report (join) message among the multicast control messages, the multicast mapping unit 12 refers to the multicast mapping information storage unit 13 and extracts a substrate-network multicast address (second multicast address) corresponding to the reporting (joining) multicast address. If the multicast mapping unit 12 has extracted a corresponding substrate-network multicast address, the multicast mapping unit 12 requests the packet encapsulation unit 14 to transmit the multicast report (join) message with the substrate-network multicast address (second multicast address).

However, if the multicast mapping unit 12 cannot extract a control-substrate-network multicast address corresponding to the reporting (joining) multicast address, the multicast mapping unit 12 determines new multicast mapping information and records a correspondence relationship in the multicast mapping information storage unit 13. After the recording, the multicast mapping unit 12 requests the multicast mapping information sharing unit 15 to notify a different packet forwarding apparatus(es) of the correspondence relationship, so as to share the information. After the sharing processing, the multicast mapping unit 12 requests the packet encapsulation unit 14 to transmit the multicast control report (join) message with the substrate-network multicast address (second multicast address).

If the multicast mapping unit 12 cannot extract a control-substrate-network multicast address (second multicast address) corresponding to the reporting (joining) multicast address, the multicast mapping unit 12 may determine new multicast mapping information by selecting a multicast address that is not used among usable multicast addresses for which a condition(s), a range, etc are previously set.

Next, a case in which the multicast mapping unit 12 is requested to perform mapping processing on a query message among the multicast control messages will be described. If the multicast mapping unit 12 is requested to perform mapping processing on a query message among the multicast control messages, the multicast mapping unit 12 refers to the multicast mapping information storage unit 13 and extracts a virtual-network multicast address corresponding to the query multicast address. If the multicast mapping unit 12 has extracted a corresponding virtual-network multicast address, the multicast mapping unit 12 requests the packet encapsulation unit 14 to transmit the multicast query message with the virtual-network multicast address. After the transmission, the multicast mapping unit 12 performs a multicast presence query sequence (which will be described below).

There are cases in which the multicast mapping unit 12 cannot extract a corresponding virtual-network multicast address. For example, if the multicast address is an all-host multicast domain address (224.0.0.1 in IP version 4), the multicast mapping unit 12 requests the packet encapsulation unit 14 to transmit the multicast query message without changing the multicast address. After the transmission, the multicast mapping unit 12 performs the multicast presence query sequence on all mapping information. If the multicast mapping unit 12 cannot determine the presence of a multicast client after performing the multicast presence query sequence, the multicast mapping unit 12 deletes the relevant correspondence relationship from the multicast mapping information storage unit 13. If the multicast mapping unit 12 cannot extract a corresponding virtual-network multicast address other than the above case, the multicast mapping unit 12 drops the received multicast query message.

Next, a case in which the multicast mapping unit 12 is requested to perform mapping processing on a group leave message among the multicast control messages will be described. In this case, the multicast mapping unit 12 refers to the multicast mapping information storage unit 13 and extracts a substrate-network multicast address (second multicast address) corresponding to the leaving multicast address. If the multicast mapping unit 12 has extracted a substrate-network multicast address corresponding to the leaving multicast address, the multicast mapping unit 12 requests the packet encapsulation unit 14 to transmit the multicast leave message with the substrate-network multicast address.

The multicast mapping information storage unit 13 at least holds a piece of mapping information indicating a correspondence relationship between a multicast address (a first multicast address) in a virtual network and a multicast address (a second multicast address) in a substrate network. FIG. 3 illustrates an example of the mapping information held in the multicast mapping information storage unit 13. While not illustrated in the example in FIG. 3, a virtual network ID or the like may be associated with each pair of multicast addresses.

By encapsulating and decapsulating packets that flow between the substrate and virtual networks, the packet encapsulation unit 14 connects virtual networks with each other to which packet forwarding apparatuses serving as TEP apparatuses are connected. More specifically, the packet encapsulation unit 14 performs processing as follows.

When the packet encapsulation unit 14 receives a packet that is not a multicast packet from the multicast determination unit 11, the packet encapsulation unit 14 encapsulates the packet with a communication address with which the packet can be forwarded to a packet forwarding apparatus corresponding to a specified destination. More specifically, if the received packet is a unicast packet, as in the method in NPLs 1 and 2, the packet encapsulation unit 14 recognizes that the received packet is a communication to the address of a packet forwarding apparatus (a TEP apparatus, strictly speaking), encapsulates the packet, and forwards the packet via the substrate-network interface 19. If the received packet is a broadcast packet or an unknown unicast packet, the packet encapsulation unit 14 encapsulates the packet with a multicast packet address used to configure the virtual network and forwards the packet via the substrate-network interface 19.

In addition, if the packet encapsulation unit 14 is requested by the multicast mapping unit 12 to encapsulate a multicast packet, the packet encapsulation unit 14 encapsulates the packet with a substrate-network multicast address (second multicast address) specified by the multicast mapping unit 12 and forwards the packet via the substrate-network interface 19. If the packet encapsulation unit 14 is requested by the multicast mapping unit 12 to forward a multicast control message, the packet encapsulation unit 14 creates a multicast control message in accordance with the request and performs a communication via the virtual-network interface 18 or the substrate-network interface 19.

In addition, if the packet encapsulation unit 14 receives a packet from the substrate-network interface 19, the packet encapsulation unit 14 determines whether the packet is an encapsulated packet and whether the packet can be forwarded to a virtual network that is under the management of its corresponding packet forwarding apparatus. If the received packet is a packet having an address associated with a virtual network under the management of its corresponding packet forwarding apparatus, the packet encapsulation unit 14 decapsulates the received packet and performs a communication via the virtual-network interface 18. If the decapsulated packet of the received packet is a mapping information sharing message, the packet encapsulation unit 14 forwards the mapping information sharing message to the multicast mapping information sharing unit 15.

If the multicast mapping information sharing unit 15 is requested by the multicast mapping unit 12 to share multicast information, the multicast mapping information sharing unit 15 creates a mapping information sharing message indicating a correspondence relationship between a virtual-network multicast address and a substrate-network multicast address. The multicast mapping information sharing unit 15 notifies the packet encapsulation unit 14 of the mapping information sharing message and requests the packet encapsulation unit 14 to encapsulate the message with a multicast packet address used to configure the default virtual network and to transmit the message. In this way, the mapping information is shared with a different packet forwarding apparatus(es).

If the multicast mapping information sharing unit 15 receives a mapping information sharing message from the packet encapsulation unit 14, the multicast mapping information sharing unit 15 stores the mapping information in the multicast mapping information storage unit 13 via the multicast mapping unit 12. If the mapping information transmitted by the mapping information sharing message conflicts with existing mapping information, the multicast mapping information sharing unit 15 resolves the conflict by a predetermined conflict resolution rule (conflict resolution algorithm). There are cases in which the mapping information transmitted by the mapping information sharing message is not registered as a result of the application of the conflict resolution rule. In such cases, the multicast mapping information sharing unit 15 creates a conflict resolution message, causes the packet encapsulation unit 14 to perform encapsulation with the multicast packet address used to configure the virtual network, and notifies the multicast mapping information sharing unit(s) 15 of a different packet forwarding apparatus (es) of the encapsulated message.

The virtual-network interface 18 transmits and receives packets to and from a virtual network(s), and the substrate-network interface 19 transmits and receives packets to and from the substrate network. These interfaces 18 and 19 may be realized as a single physical interface.

Figure 4:
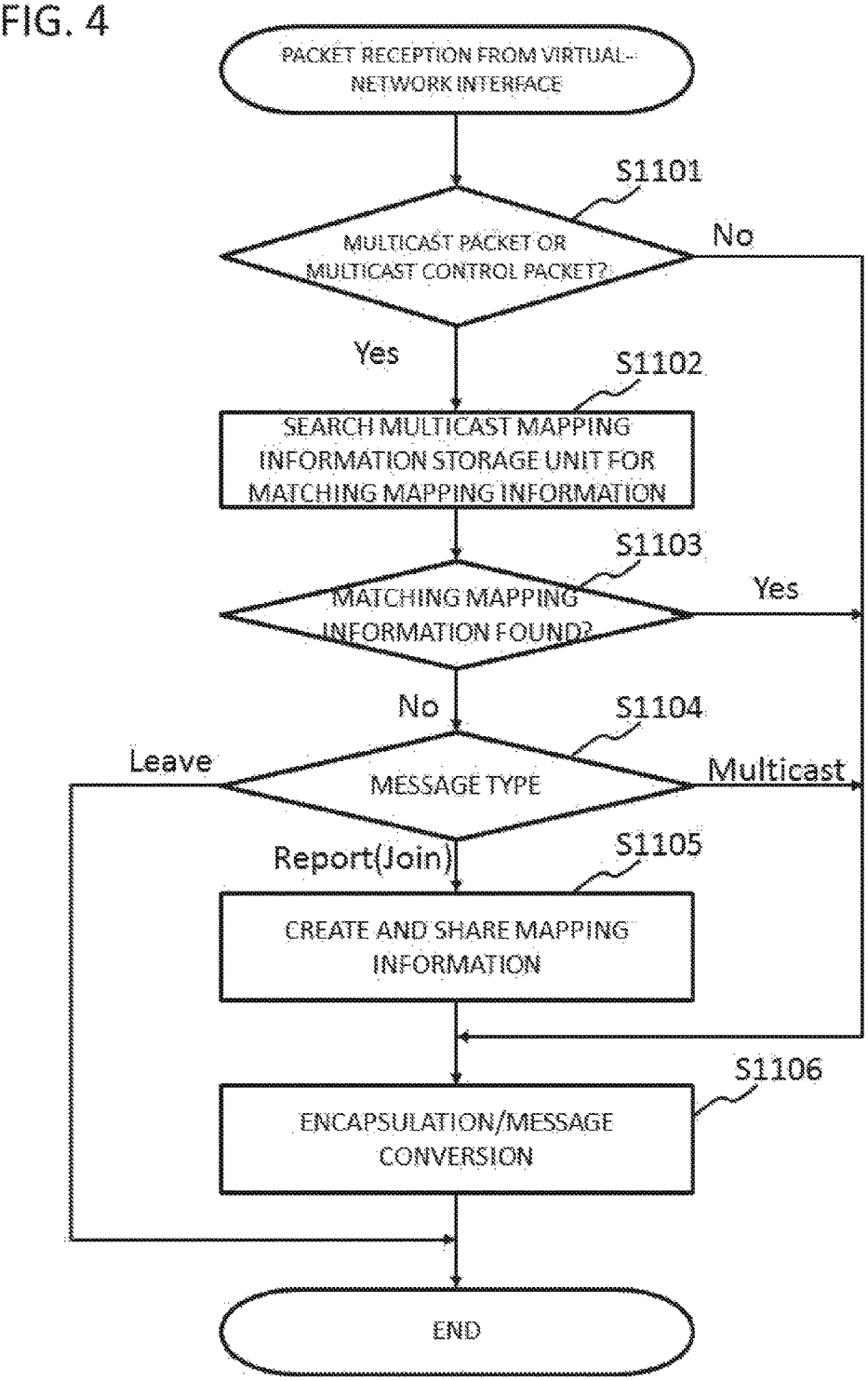
FIG. 4 is a flowchart illustrating an operation that the packet forwarding apparatus according to the first exemplary embodiment of the present invention performs (when receiving a packet via a virtual-network interface).

Next, an operation according to the present exemplary embodiment will be described in detail with reference to the drawings. FIG. 4 is a flowchart illustrating an operation that the packet forwarding apparatus according to the first exemplary embodiment of the present invention performs (when receiving a packet via the virtual-network interface). As illustrated in FIG. 4, when receiving a packet, the virtual-network interface 18 transmits the received packet to the multicast determination unit 11. The multicast determination unit 11 determines whether the received packet is a multicast packet or a multicast communication control message (step S1101).

If the received packet is not a multicast communication or a multicast communication control message (No in step S1101), the multicast determination unit 11 transmits the received packet to the packet encapsulation unit 14 and requests the packet encapsulation unit 14 to encapsulate the packet. If the packet encapsulation unit 14 holds information about the unicast communication peer, the packet encapsulation unit 14 encapsulates the packet, recognizing that the communication is a unicast communication to a packet forwarding apparatus to which the communication peer is connected. Next, the packet encapsulation unit 14 transmits the packet to the substrate-network interface 19. Other than the above case (if the received packet is a broadcast packet, an unknown unicast packet, etc.), the packet encapsulation unit 14 encapsulates the packet with the substrate-network multicast address of the corresponding virtual network and transmits the packet to the substrate-network interface 19. The substrate-network interface 19 transmits the encapsulated packet to the substrate network (step S1106).

If the received packet is a multicast communication or a multicast communication control message, the multicast determination unit 11 transmits the packet to the multicast mapping unit 12. The multicast mapping unit 12 searches the multicast mapping information storage unit 13 for mapping information in which the multicast address (first multicast address) of the received packet is associated with a substrate-network multicast address (second multicast address) (step S1102).

If the multicast mapping unit 12 finds mapping information corresponding to the received packet (Yes in step S1103), the multicast mapping unit 12 transmits the received packet and the mapping information to the packet encapsulation unit 14 and requests the packet encapsulation unit 14 to encapsulate the packet. If the received packet is a multicast packet, the packet encapsulation unit 14 encapsulates the packet with a substrate-network multicast address (second multicast address) specified in the mapping information and transmits the encapsulated packet to the substrate-network interface 19. If the received packet is a multicast control message, the packet encapsulation unit 14 replaces the control multicast address information with a substrate-network multicast address (second multicast address) specified in the mapping information and transmits the packet to the substrate-network interface 19. The substrate-network interface 19 transmits the encapsulated packet to the substrate network (step S1106).

In step S1103, if the multicast mapping unit 12 cannot find mapping information corresponding to the received packet, the multicast mapping unit 12 processes the multicast control message as follows, depending on the kind of the message. First, if the received packet is a group leave message, the multicast mapping unit 12 drops the packet and ends the present processing (Leave in step S1104).

If the received packet is a group report (join) message (Report (Join) in step S1104), the multicast mapping unit 12 creates mapping information in which a virtual-network multicast address (first multicast address) and a substrate-network multicast address (second multicast address) are associated with each other and registers the mapping information in the multicast mapping information storage unit 13. To share the created mapping information, the multicast mapping unit 12 creates a mapping information sharing message and requests the packet encapsulation unit 14 to encapsulate the message with the substrate-network multicast address of the corresponding virtual network. The packet encapsulation unit 14 encapsulates the mapping information sharing message with the substrate-network multicast address of the virtual network and transmits the encapsulated packet to the substrate network via the substrate-network interface 19 (step S1105).

Next, the multicast mapping unit 12 requests the packet encapsulation unit 14 to convert the multicast report (join) message, which is the received packet, by using the newly created mapping information. The packet encapsulation unit 14 replaces the control multicast address information of the multicast report (join) message with a substrate-network multicast address (second multicast address) specified in the mapping information and transmits the message to the substrate network via the substrate-network interface 19 (step S1106).

The multicast mapping unit 12 may create mapping information for the multicast address by selecting a substrate multicast address from among usable substrate multicast addresses prepared in advance. In this case, it is preferable that a usable range be set per virtual network. This presetting may be made in various ways. For example, the presetting may be made in an individual apparatus or by an external setting integration controller when basic settings of the corresponding virtual network are made.

In step S1104, if the received packet is a multicast communication (Multicast in S1104), the multicast mapping unit 12 requests the packet encapsulation unit 14 to encapsulate the packet with the substrate-network multicast address of the corresponding virtual network. The packet encapsulation unit 14 encapsulates the received multicast packet with the substrate-network multicast address of the corresponding virtual network and transmits the encapsulated packet to the substrate network via the substrate-network interface 19 (step S1106).

Through the above processing, encapsulation control on a packet received from a virtual network is realized.

Figure 5:
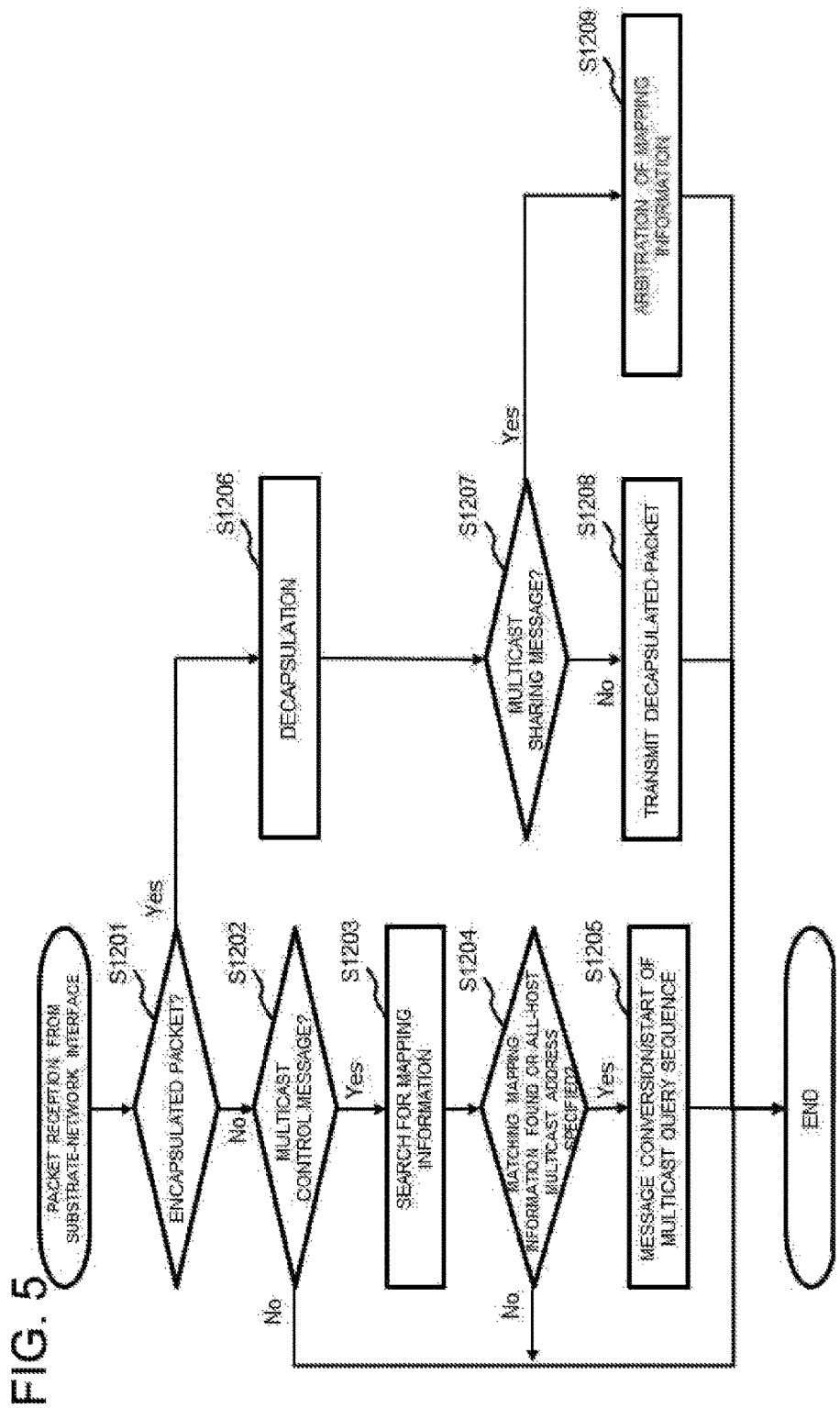
FIG. 5 is a flowchart illustrating an operation that the packet forwarding apparatus according to the first exemplary embodiment of the present invention performs (when receiving a packet via a substrate-network interface).

Next, an operation that the packet forwarding apparatus performs when receiving a packet via the substrate-network interface 19 will be described. FIG. 5 is a flowchart illustrating an operation that the packet forwarding apparatus according to the first exemplary embodiment of the present invention performs (when receiving a packet via the substrate-network interface).

As illustrated in FIG. 5, when receiving a packet from the substrate network, the substrate-network interface 19 transmits the received packet to the packet encapsulation unit 14. The packet encapsulation unit 14 determines whether the received packet is an encapsulated packet (step S1201).

If the received packet is not an encapsulated packet (No in step S1201), the packet encapsulation unit 14 determines whether the received packet is a multicast control message (step S1202). If the received packet is neither an encapsulated packet nor a multicast control message, the packet encapsulation unit 14 drops the received packet (No in step S1202).

If the received packet is a multicast control message (Yes in step S1202), the packet encapsulation unit 14 transmits the received packet to the multicast mapping unit 12 and requests the multicast mapping unit 12 to search for mapping information corresponding to the multicast address of the received packet. The multicast mapping unit 12 searches the multicast mapping information storage unit 13 for mapping information corresponding to the multicast address of the received packet (step S1203).

If the multicast mapping unit 12 finds mapping information corresponding to the multicast address of the received packet, the multicast mapping unit 12 forwards the received packet and the mapping information to the packet encapsulation unit 14. If the multicast address of the received packet is an all-host multicast domain address (for example, 224.0.0.1 in IP version 4), the multicast mapping unit 12 requests the packet encapsulation unit 14 to forward the received packet, without converting the address of the received packet.

Based on the mapping information, the packet encapsulation unit 14 changes the control target multicast address of the received packet (multicast control message) to a virtual-network multicast address (first multicast address). The multicast mapping unit 12 transmits the changed multicast control message to the corresponding virtual network via the virtual-network interface 18. In this case, if the multicast control message is a query message (Query), the packet encapsulation unit 14 performs the multicast presence query sequence (Yes in step S1204 and S1205).

If the multicast mapping unit 12 cannot extract multicast mapping information corresponding to the received packet, the multicast mapping unit 12 drops the received packet and ends the present processing (No in step S1204).

In step S1201, if the received packet is an encapsulated packet (Yes in step S1201), the packet encapsulation unit 14 decapsulates the received packet and extracts the internal message (step S1206).

The packet encapsulation unit 14 determines whether the decapsulated packet is a multicast sharing message. If the packet is not a multicast sharing message (No in step S1207), the packet encapsulation unit 14 transmits the decapsulated packet to the corresponding virtual network via the virtual-network interface 18 (step S1208).

If the decapsulated packet is a multicast sharing message (Yes in step S1207), the packet encapsulation unit 14 notifies the multicast mapping information sharing unit 15 of the multicast sharing message. Based on the multicast sharing message, the multicast mapping information sharing unit 15 requests the multicast mapping unit 12 to register the corresponding mapping information in the multicast mapping information storage unit 13. In this case, the multicast mapping information sharing unit 15 can operate a mapping information arbitration algorithm. If a priority is given to the mapping information in its corresponding apparatus as a result of the arbitration by the arbitration algorithm, the multicast mapping information sharing unit 15 transmits the mapping information in its corresponding apparatus to the mapping information sharing unit(s) 15 of a different packet forwarding apparatus(es). More specifically, instructed by the multicast mapping information sharing unit 15, the packet encapsulation unit 14 encapsulates the multicast sharing message with the substrate-network multicast address of the corresponding virtual network and transmits the message (step S1209).

In an example of the mapping information arbitration algorithm, priorities are set based on identifiers, and mapping information having a higher priority is selected.

Examples of the identifiers include apparatus IDs, apparatus IF addresses, apparatus setting priorities, multicast addresses used in mapping information, and mapping information creation time. At least one of the above kinds may be used, and mapping information having a higher priority in an order may be selected.

Through the above processing, decapsulation control on a packet received from the substrate network is realized.

Next, specific operations performed by the configuration according to the first exemplary embodiment will be described with reference to FIGS. 6 to 17. Hereinafter, terms and messages used in the drawings will be described. In FIGS. 6 to 17, a Video VM 1 and a Video VM 2 are streaming servers, and Client VMs 1-1, 1-2, 2-1, and 2-2 are clients that receive streaming data from these streaming servers. A router 300 is a router (which will hereinafter be referred to as a "multicast router," as needed) having an IP multicast function. At least one router 300 is arranged in a substrate network. In addition, TEPs (apparatuses) 301 to 303 in FIGS. 6 to 17 are each configured by the packet forwarding apparatus 1 according to the first exemplary embodiment. In the following description, each of the Video VMs and Client VMs is a virtual entity that operates on a server connected to a TEP (an apparatus) by using a server virtualization technique.

In this example, the streaming server 311 transmits streaming data to the clients 312 and 313 by using multicast. The multicast address that is used in this case is 225.0.0.1. Likewise, the streaming server 321 transmits streaming data to the clients 322 and 323 by using multicast. The multicast address used in this case is 226.0.0.1. These two streaming servers and four clients belong to a single group and configure a single virtual network. The following description will be made assuming that 239.0.0.1 is set as the virtual-network multicast address used in this case and that the multicast address for mapping is used from 238.0.0.1 as needed.

In addition, in the following description, IGMP (Internet Group Management Protocol) will be used as a multicast group management protocol, and a multicast control message will be represented by "IGMP [message type] [target IP address]." Additional information attached to an individual message will be omitted. There are various message types. For example, a report (join) message will be represented as "Report (join)", a query message as "Query," and a leave message as "Leave." A leave query message GroupSpecific-Query in response to Leave is handled as "Query" as is the case with a query message. However, depending on the implementation method, these messages may be handled separately.

A communication message will be represented as "[address] {[message]}." Only the destination address is written. While the source address, attribute information, etc. are attached in practice, such information is omitted in the present example. After a packet is encapsulated, since this communication message serves as a message body, the packet is represented as "[encapsulation address] {[encapsulated address] {message}}." A mapping information sharing message will be represented as "Shared Inner [virtual network address] Outer [substrate network address]." In addition, data actually handled by an application will be represented as "DATA."

[Creation of Multicast Group, Mapping, Encapsulation]

First, before a multicast service is started, the streaming server 311 transmits IGMP Report (join) 225.0.0.1 as a multicast report (join) message. When receiving this packet, the TEP (packet forwarding apparatus) 301 recognizes that this packet is transmitted from a virtual network (starts the processing in FIG. 4). The multicast determination unit 11 of the TEP (packet forwarding apparatus) 301 determines that this packet is a multicast control message and requests the multicast mapping unit 12 to search for mapping information (steps S1101 and S1102 in FIG. 4).

Unable to find the corresponding mapping information, the multicast mapping unit 12 checks the message type and determines that the message type is a report (join) message (Report). Thus, the multicast mapping unit 12 selects 238.0.0.1 as the corresponding substrate-network multicast address from the multicast address for mapping and creates mapping information. The multicast mapping unit 12 stores the created mapping information in the multicast mapping information storage unit 13 (see the first entry in FIG. 3).

The multicast mapping unit 12 transmits the created mapping information to the multicast mapping information sharing unit 15 and requests sharing of the mapping information with a different TEP(s) (a packet forwarding apparatus(es)). The multicast mapping information sharing unit 15 creates a mapping information sharing message "Shared Inner 225.0.0.1 Outer 238.0.0.1" and requests the packet encapsulation unit 14 to forward the message with the multicast address used to configure the virtual network.

The packet encapsulation unit 14 encapsulates the message with the multicast address 239.0.0.1 used to configure the virtual network and performs a multicast communication. The multicast router 300 forwards the encapsulated mapping information sharing message to the other TEP apparatuses 302 and 303 that belong to the virtual network (steps S1103 to S1105 in FIG. 4).

Figure 6:
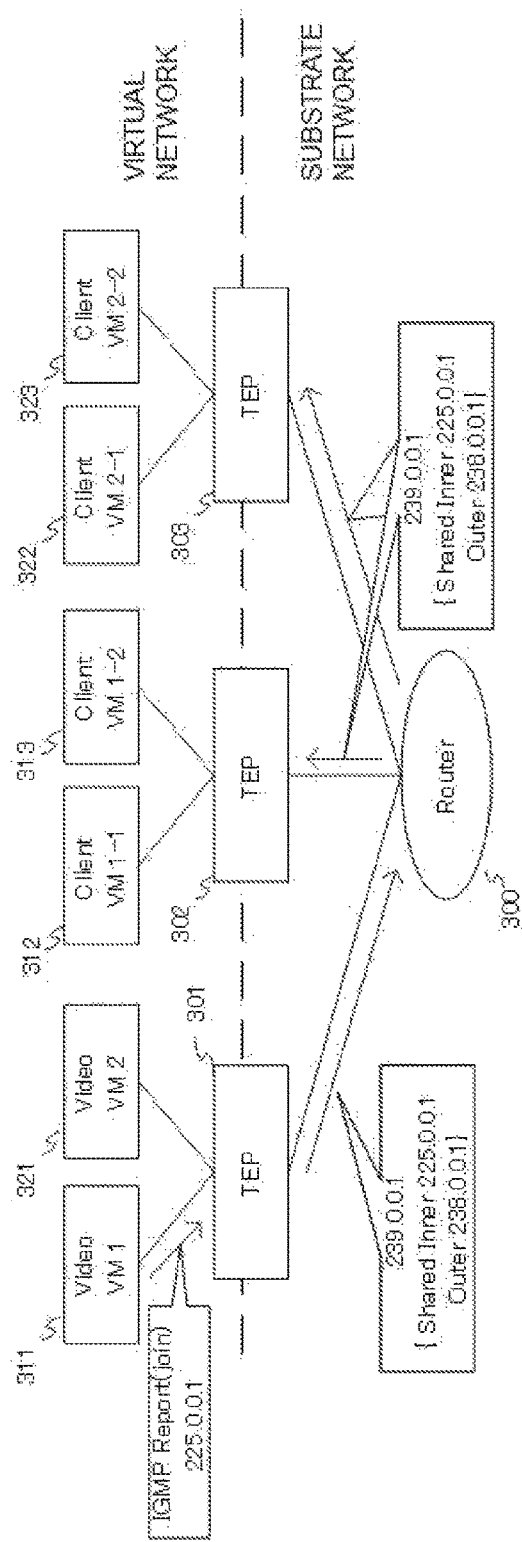
FIG. 6 illustrates a specific example of an operation performed by the packet forwarding apparatus according to the first exemplary embodiment of the present invention (sharing of mapping information).

When receiving the encapsulated mapping information sharing message, the TEP apparatuses 302 and 303 handle the mapping information sharing message as a packet from the substrate network (starts the processing in FIG. 5). Since the packet is an encapsulated packet, the packet encapsulation unit 14 decapsulates the packet and extracts the mapping information sharing message "Shared Inner 225.0.0.1 Outer 238.0.0.1 (S1201 to S1206 in FIG. 5). Since a mapping information sharing message is extracted as a result of the decapsulation, the packet encapsulation unit 14 notifies the multicast mapping unit 12 of the message and requests the multicast mapping unit to store the mapping information in the multicast mapping information storage unit 13 (S1207 to S1209 in FIG. 5). In this way, the multicast mapping information is shared. FIG. 6 illustrates a flow in which the multicast report (join) message (IGMP Report (join)) is transmitted from the streaming server 311 and mapping information is generated and shared with the other TEPs (packet forwarding apparatuses) by using the mapping information sharing message.

Figure 7:
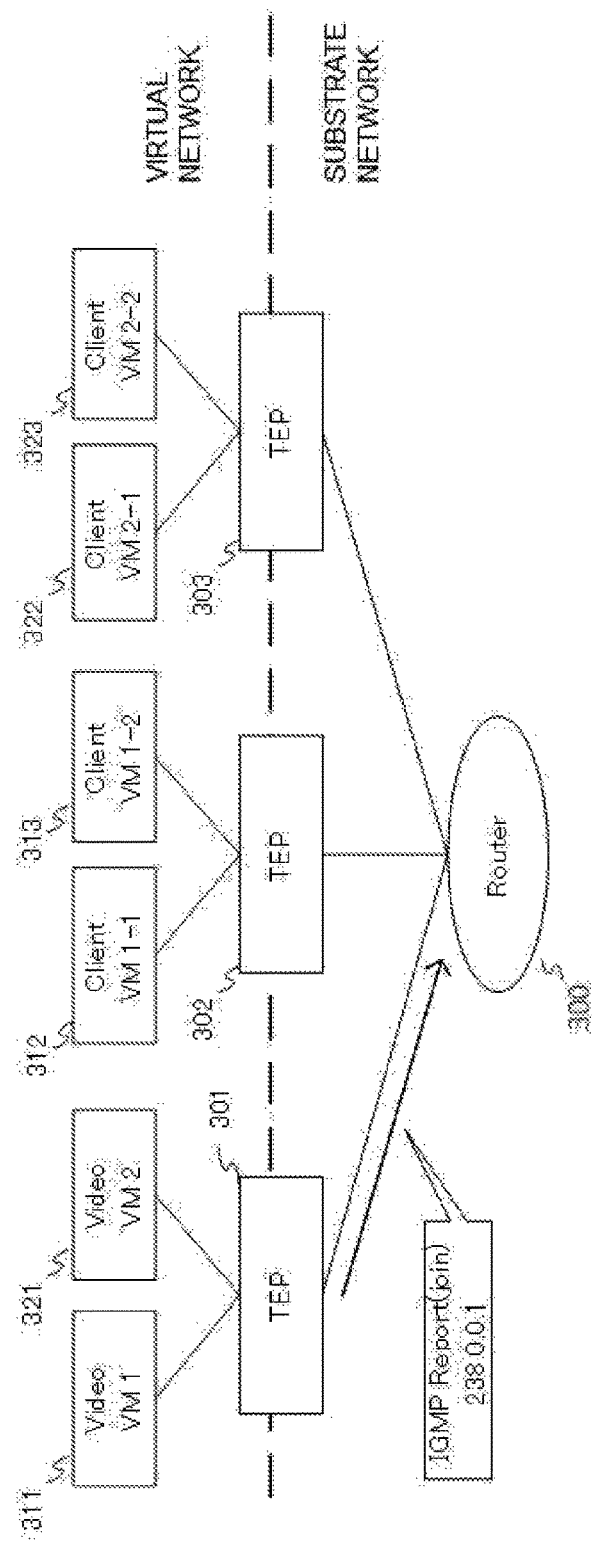
FIG. 7 illustrates a specific example of an operation performed by the packet forwarding apparatus according to the first exemplary embodiment of the present invention (rewriting and forwarding of a multicast report (join) message).

Next, the multicast mapping unit 12 of the TEP (packet 980 forwarding apparatus) 301 transmits the received packet "IGMP Report (join) 225.0.0.1" and the created mapping information to the packet encapsulation unit 14. Based on the received information, the packet encapsulation unit 14 converts the multicast control information into a substrate-network multicast address and creates "IGMP Report (join) 238.0.0.1". The packet encapsulation unit 14 transmits the converted multicast control message to the substrate network. FIG. 7 illustrates a state in which the TEP (packet forwarding apparatus) 301 has transmitted the converted multicast control message to the substrate network.

In this way, the virtual-network multicast address 225.0.0.1 is associated with the substrate-network multicast address 238.0.0.1, and the multicast router 300 recognizes that only the TEP apparatus 301 belongs to the multicast group 238.0.0.1.

Figure 8:
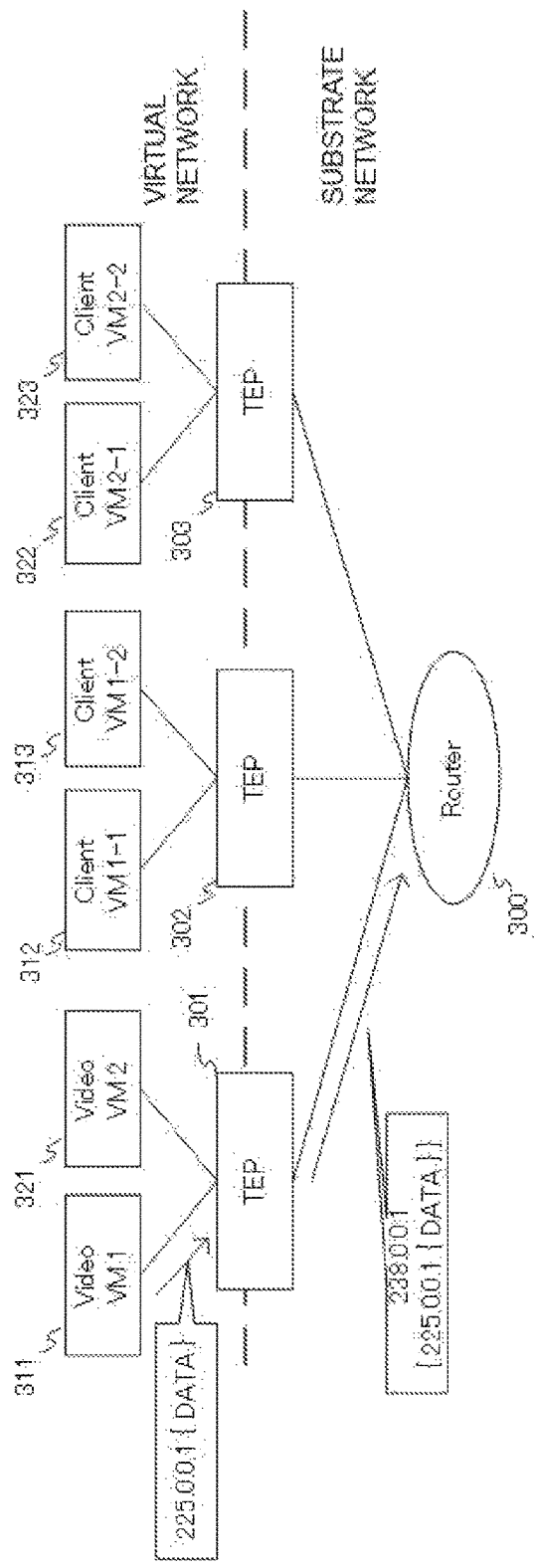
FIG. 8 illustrates a specific example of an operation performed by the packet forwarding apparatus according to the first exemplary embodiment of the present invention (forwarding of multicast data).
Figure 9:
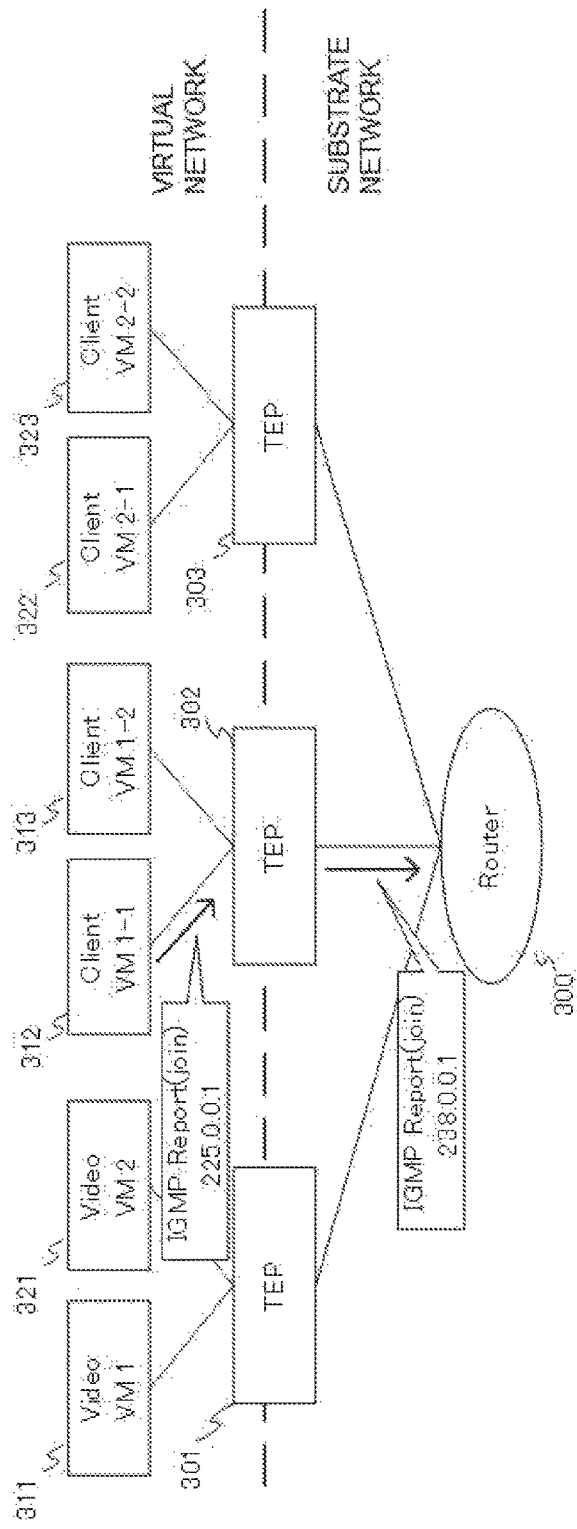
FIG. 9 illustrates a specific example of an operation performed by the packet forwarding apparatus according to the first exemplary embodiment of the present invention (forwarding of a multicast report (join) message from a client).

When the streaming server 311 transmits streaming data, a message "225.0.0.1 {DATA}" flows and reaches the TEP (packet forwarding apparatus) 301, as illustrated in FIG. 8. When receiving the packet, the TEP (packet forwarding apparatus) 301 handles the packet as a packet from the virtual network (starts the processing in FIG. 4).

The multicast determination unit 11 in the TEP (packet forwarding apparatus) 301 determines that the packet is a multicast control message and requests the multicast mapping unit 12 to search for mapping information (steps S1101 and S1102 in FIG. 4). Since the multicast mapping unit 12 finds the created mapping information, the multicast mapping unit 12 transmits the mapping information and the received packet to the packet encapsulation unit 14. The packet encapsulation unit 14 encapsulates the packet based on the received information, creates a message "238.0.0.1{225.0.0.1 {DATA}}," and transmits the message to the substrate network. Since only the TEP (packet forwarding apparatus) 301 belongs to the multicast group 238.0.0.1, the multicast router 300 does not perform new forwarding (see FIG. 8).

Next, when the client 312 wishes to receive multicast data from the streaming server 311, the client 312 transmits IGMP Report (join) 225.0.0.1 as a multicast report (join) message. When receiving this packet, the TEP (packet forwarding apparatus) 302 handles the packet as a packet from the virtual network (starts the processing in FIG. 4). The multicast determination unit 11 in the TEP (packet forwarding apparatus) 302 determines that the packet is a multicast control message and requests the multicast mapping unit 12 to search for mapping information (steps S1101 and S1102 in FIG. 4). Since the multicast mapping unit 12 finds the corresponding mapping information, the multicast mapping unit 12 transmits the mapping information to the packet encapsulation unit 14. Based on the received information, the packet encapsulation unit 14 converts the multicast address in the multicast control information into the substrate-network multicast address and creates "IGMP Report (join) 238.0.0.1." The packet encapsulation unit 14 transmits the converted multicast control message to the substrate network. In this way, the TEP apparatus 302 also joins the multicast group 238.0.0.1 (see FIG. 9).

Figure 10:
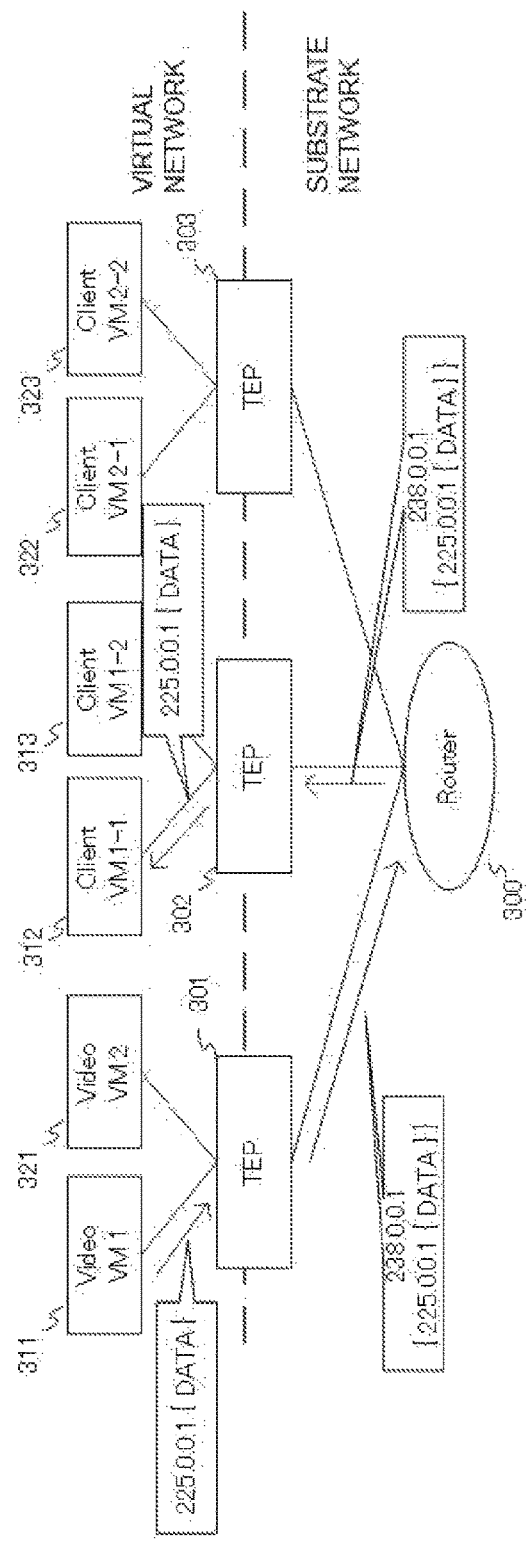
FIG. 10 illustrates a specific example of an operation performed by the packet forwarding apparatus according to the first exemplary embodiment of the present invention (forwarding of multicast data to a member in a group).

After the above processing, as illustrated in FIG. 10, the TEP (packet forwarding apparatus) 301 encapsulates the streaming data "225.0.0.1 {DATA}" transmitted from the streaming server 311 to create the message "238.0.0.1{225.0.0.1 {DATA}}." Subsequently, the message reaches to the TEP apparatus 302 via the multicast router 300.

When receiving the encapsulated message "238.0.0.1{225.0.0.1 {DATA}}," the TEP (packet forwarding apparatus) 302 handles the message as a packet from the substrate network (starts the processing in FIG. 5). Since the packet is an encapsulated packet, the packet encapsulation unit 14 decapsulates the packet and extracts the multicast communication message "225.0.0.1 {DATA} (S1201 and S1206 in FIG. 5). Since the decapsulation result is not a mapping information sharing message, the packet encapsulation unit 14 transmits the multicast communication message to the virtual network (S1207 and S1208 in FIG. 5). In this way, the streaming data transmitted from the streaming server 311 reaches the client 312 as multicast data in the same virtual network (see FIG. 10).

Figure 11:
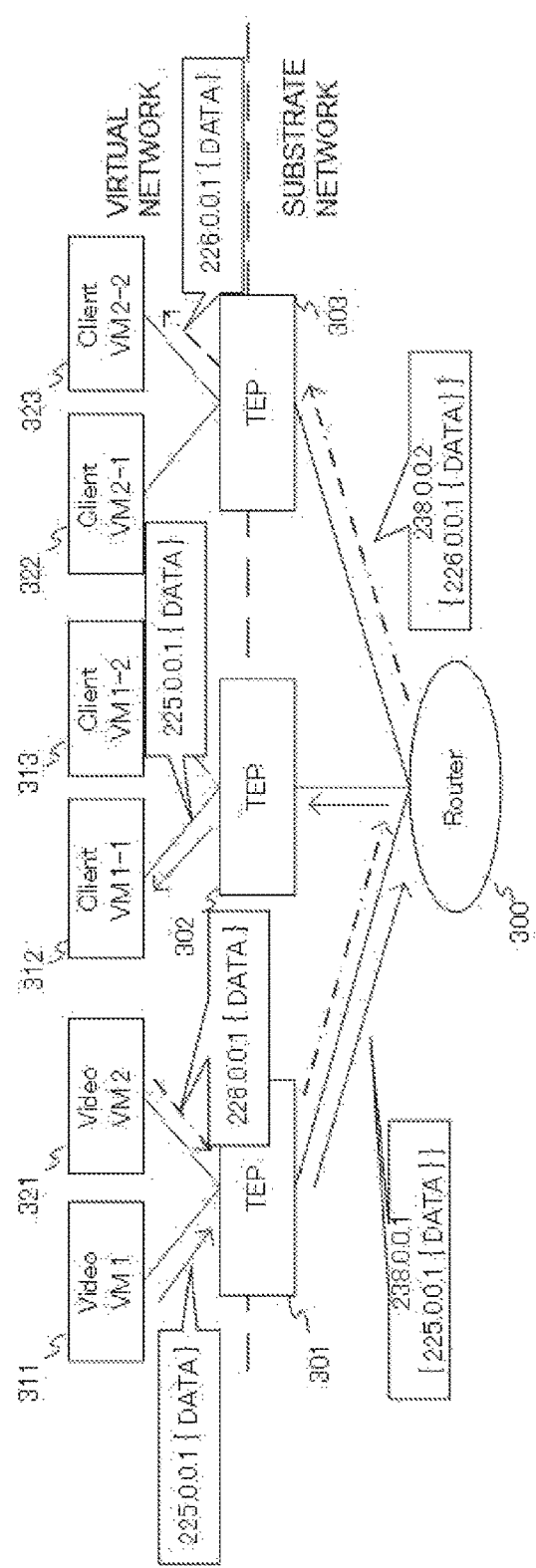
FIG. 11 illustrates a specific example of an operation performed by the packet forwarding apparatus according to the first exemplary embodiment of the present invention (forwarding of multicast data to members in different groups).

In the same way as the above flow, when the streaming server 321 and the client 323 join a group whose multicast address is 226.0.0.1, the multicast address is associated with a substrate-network multicast address 238.0.0.2 (for example, see the second entry in FIG. 3). FIG. 11 illustrates a state in which packets having the above two virtual-network multicast addresses are encapsulated with the substrate-network multicast addresses at the entry-side TEPs (packet forwarding apparatuses), the encapsulated packets are forwarded to the destination TEPs (packet forwarding apparatuses), and the encapsulated packets are decapsulated and forwarded to the clients, respectively. As illustrated in FIG. 11, the communication that belongs to the multicast group having the new multicast address 226.0.0.1 is forwarded only between the TEPs (packet forwarding apparatuses) 301 and 303. The communication is not forwarded to the TEP (packet forwarding apparatus) 302.

As described above, a virtual-network multicast communication can be controlled in the same way as a substrate-network multicast communication. In addition, multicast addresses in the substrate network can be distinguished. For example, 239.0.0.1 is allocated to the entire virtual network, 238.0.0.1 to a streaming from the streaming server 311, and 238.0.0.2 to a streaming from the streaming server 321. Thus, the present technique can be used for load balancing and QoS control.

[Maintenance and Management of Multicast Group]

Figure 12:
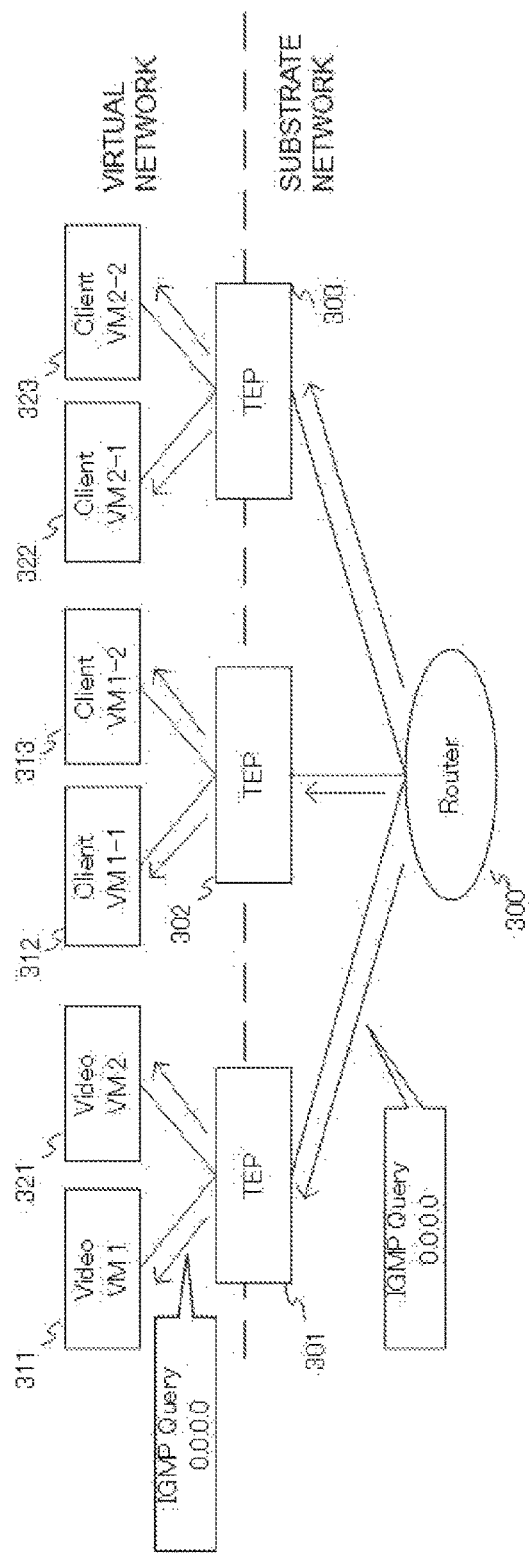
FIG. 12 illustrates a specific example of an operation performed by the packet forwarding apparatus according to the first exemplary embodiment of the present invention (forwarding of a query message to multicast groups).

Next, maintenance of a multicast group will be described with reference to FIG. 12. In IGMP, by transmitting a Query to an all-host multicast domain address (224.0.0.1 in IP version 4), a multicast router requests for communication of a report (join) message IGMP Report. As illustrated in FIG. 12, the multicast router 300 creates "IGMP Query 0.0.0.0" whose destination address is 224.0.0.1 and transmits "IGMP Query 0.0.0.0" to all the TEPs (packet forwarding apparatuses).

The TEPs (packet forwarding apparatuses) 301 to 303 handle the multicast control message as a packet from the substrate network (starts the processing in FIG. 5). Since the received packet is not an encapsulated packet, the packet encapsulation unit 14 requests the multicast mapping unit 12 to extract mapping information (S1201 to S1203 in FIG. 5). The multicast mapping unit 12 reports to the packet encapsulation unit 14 that there is no corresponding mapping information. However, because of the all-host multicast address 224.0.0.1, the packet encapsulation unit 14 handles the information as it is. Namely, the information is transmitted to the virtual network (S1204 and S1205 in FIG. 5). In this way, it is possible to have individual terminals or arbitrary terminals in the virtual network to receive the Query message and transmit Report. In addition, the multicast mapping unit 12 performs the multicast presence query sequence. If the presence of a multicast client is not determined by performing the multicast presence query sequence, namely, if there is a group for which no Report is transmitted, the corresponding mapping information is deleted from the multicast mapping information storage unit 13.

[Leaving Multicast Group]

Figure 13:
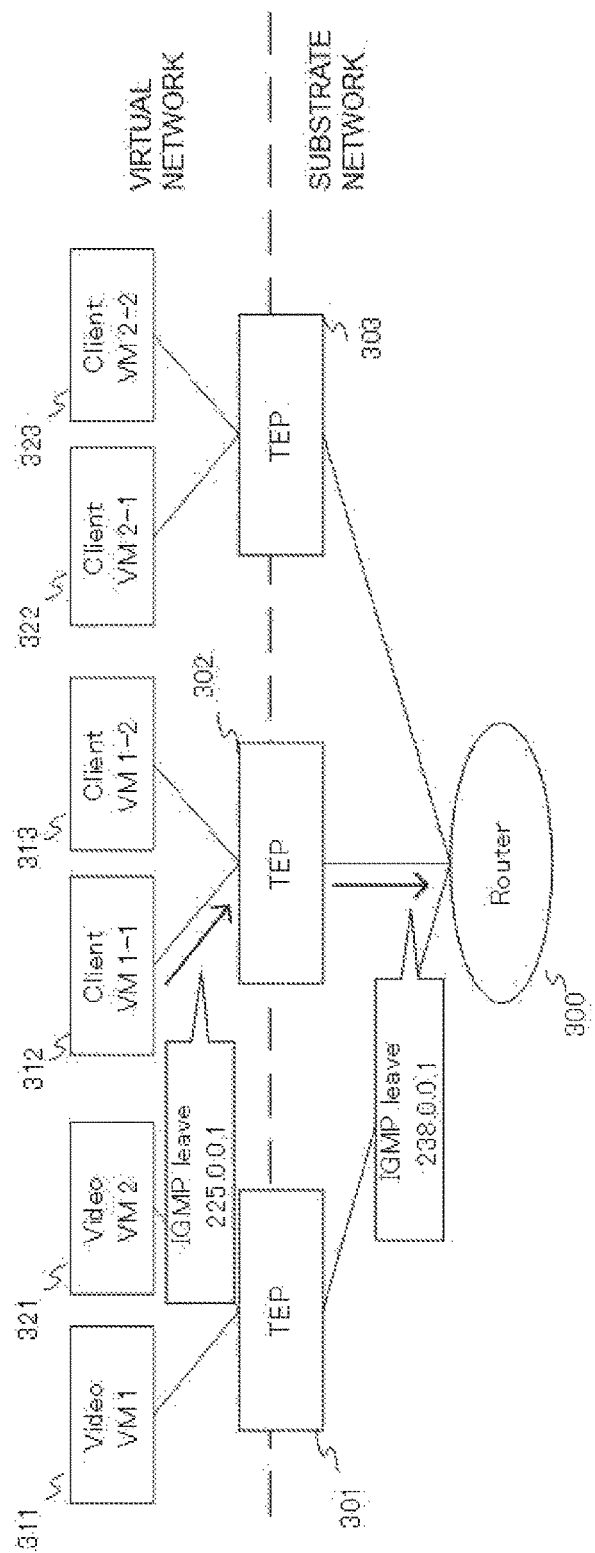
FIG. 13 illustrates a specific example of an operation performed by the packet forwarding apparatus according to the first exemplary embodiment of the present invention (forwarding of a multicast leave message from a client).
Figure 14:
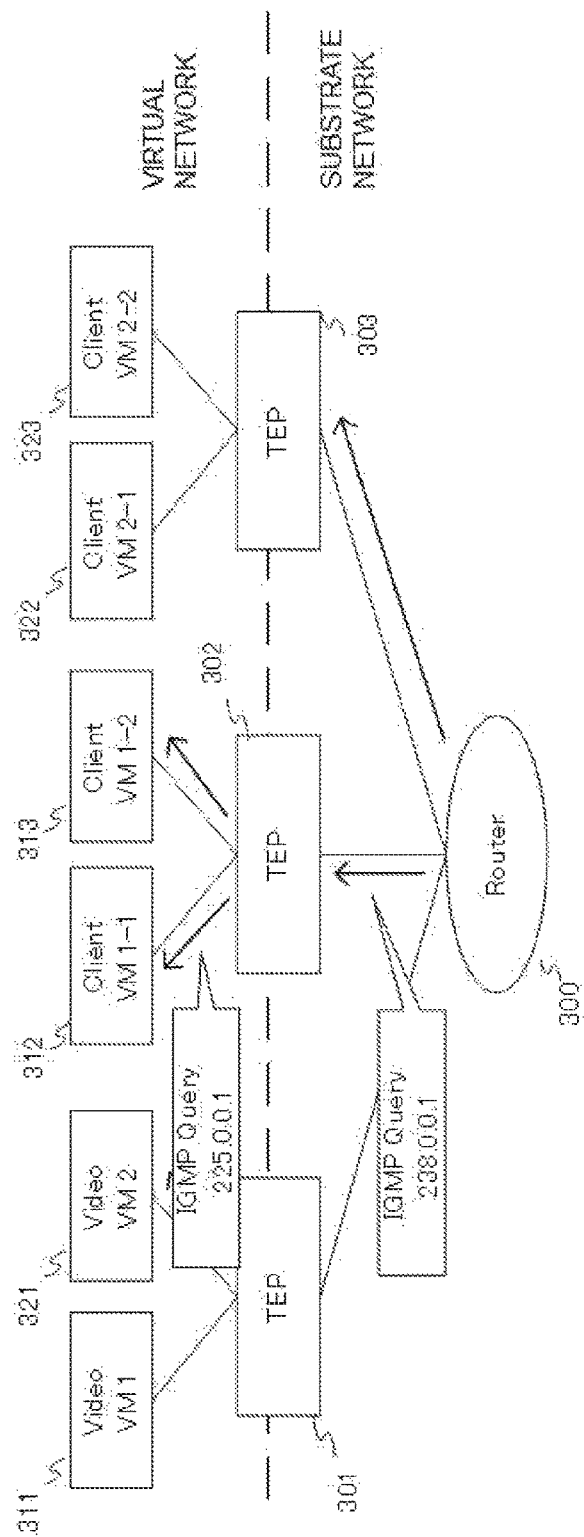
FIG. 14 illustrates a specific example of an operation performed by the packet forwarding apparatus according to the first exemplary embodiment of the present invention (forwarding of a presence query message to multicast groups).

Next, leaving a multicast group will be described with reference to FIGS. 13 and 14. After IGMP v2, when a client leaves a multicast communication, the client transmits a Leave message. The following description will be made assuming that, as illustrated in FIG. 13, the client 312 transmits "IGMP Leave 225.0.0.1" to leave the group. When receiving this packet, the TEP (packet forwarding apparatus) 302 handles the packet as a packet from the virtual network (starts the processing in FIG. 4). The multicast determination unit 11 in the TEP (packet forwarding apparatus) 302 determines that the packet is a multicast control message and requests the multicast mapping unit 12 to search for mapping information (step S1101 and S1102 in FIG. 4). Since the multicast mapping unit 12 finds corresponding mapping information, the multicast mapping unit 12 transmits the mapping information to the packet encapsulation unit 14. Based on the received information, the packet encapsulation unit 14 converts the multicast control information into the substrate-network multicast address and creates "IGMP Leave 238.0.0.1." The packet encapsulation unit 14 transmits the converted multicast control message to the substrate network. In this way, the multicast router 300 receives a message indicating leaving the multicast group 238.0.0.1 (see FIG. 13.)

When receiving the multicast leave message, the multicast router 300 transmits a presence query message "IGMP Query 238.0.0.1" as a response, to determine whether any member exists in the corresponding group. When receiving the leave query message, the TEP (packet forwarding apparatus) 302 handles the packet as a packet from the substrate network (starts the processing in FIG. 5). Since the received packet is not an encapsulated packet, the packet encapsulation unit 14 requests the multicast mapping unit 12 to search for mapping information (S1201 to S1203 in FIG. 5). The multicast mapping unit 12 finds corresponding mapping information and notifies the packet encapsulation unit 14 of the mapping information. By using the mapping information, the packet encapsulation unit 14 converts the message so that the multicast control address is handled as a virtual-network multicast address. In this example, as illustrated in FIG. 14, the packet encapsulation unit 14 converts the message into a leave query message indicated by "IGMP Query 225.0.0.1" and transmits the message to the virtual network (S1204 and S1205). In this way, it is possible to have individual terminals or arbitrary terminals in the virtual network to transmit Report. The multicast mapping unit 12 performs the multicast presence query sequence at this timing, too. If a multicast group in which the presence of a client is not determined is detected by performing the multicast presence query sequence, namely, there is no Report, the multicast mapping information storage unit 13 deletes the corresponding mapping information (for example, deletes the first entry in FIG. 3).

[Arbitration of Mapping Information]

Figure 15:
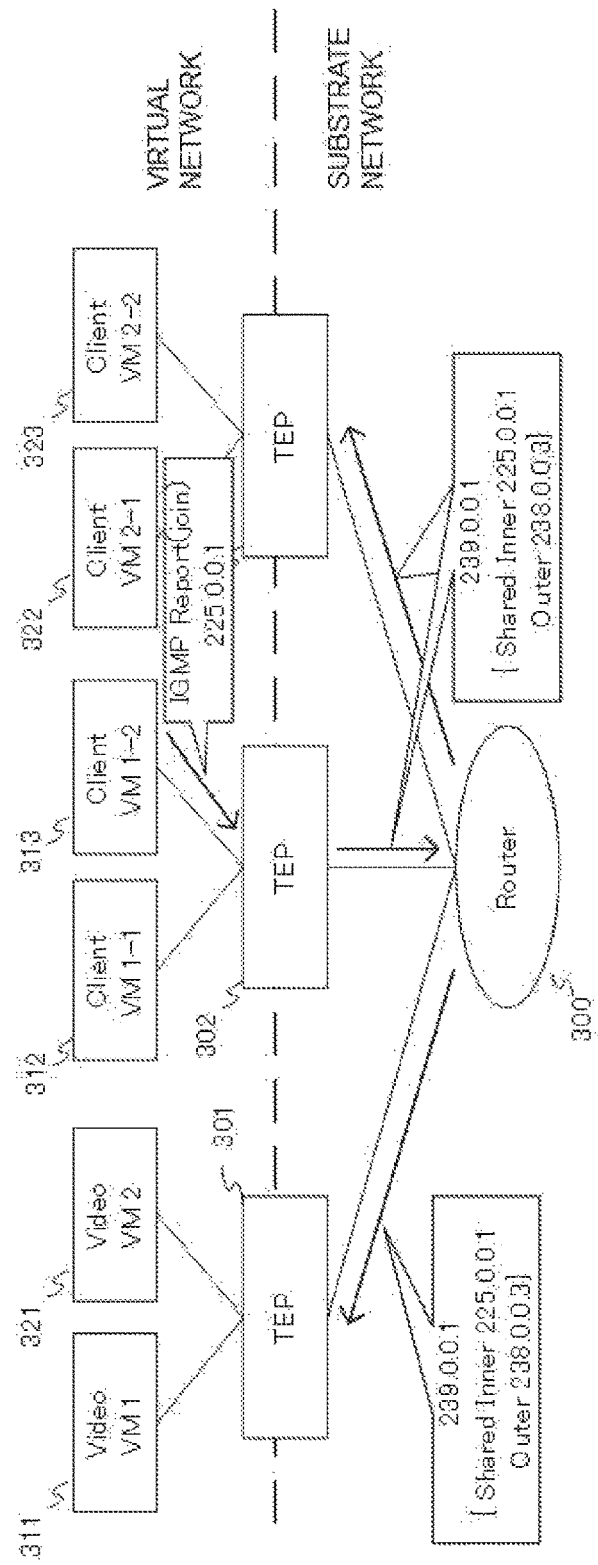
FIG. 15 illustrates a specific example of an operation performed by the packet forwarding apparatus according to the first exemplary embodiment of the present invention (sharing of mapping information).
Figure 16:
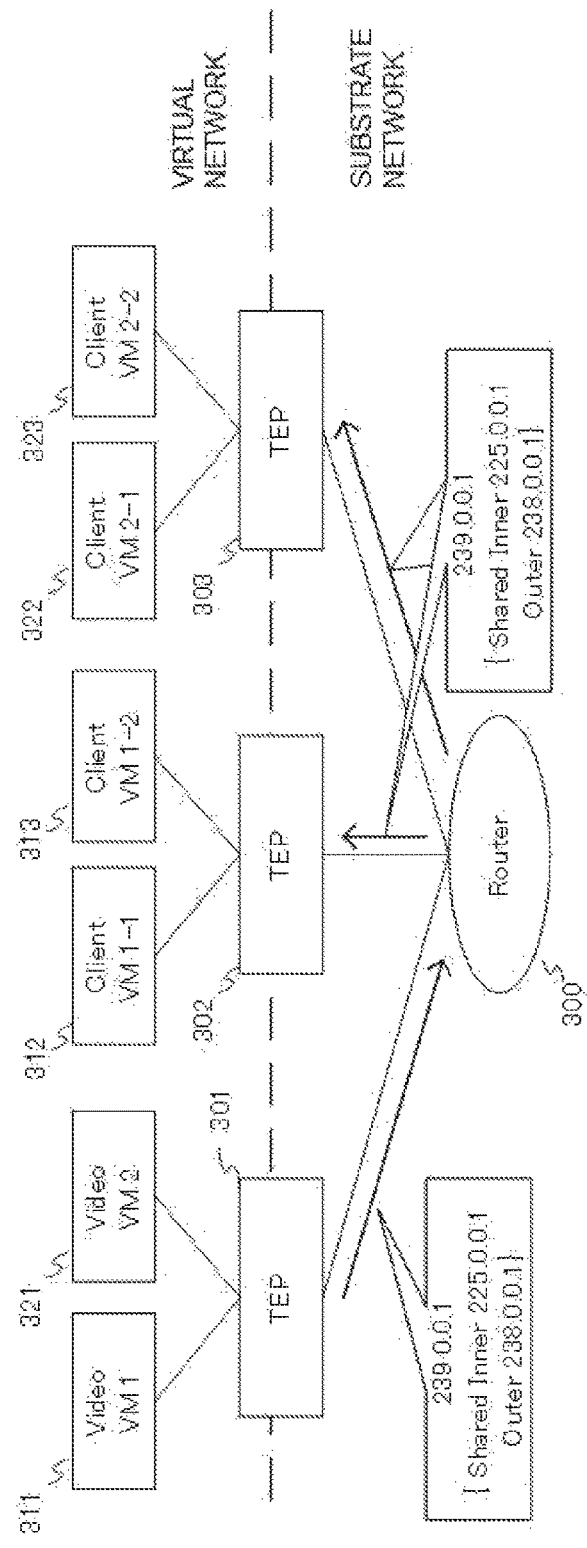
FIG. 16 illustrates a specific example of an operation performed by the packet forwarding apparatus according to the first exemplary embodiment of the present invention (arbitration of mapping information).
Figure 17:
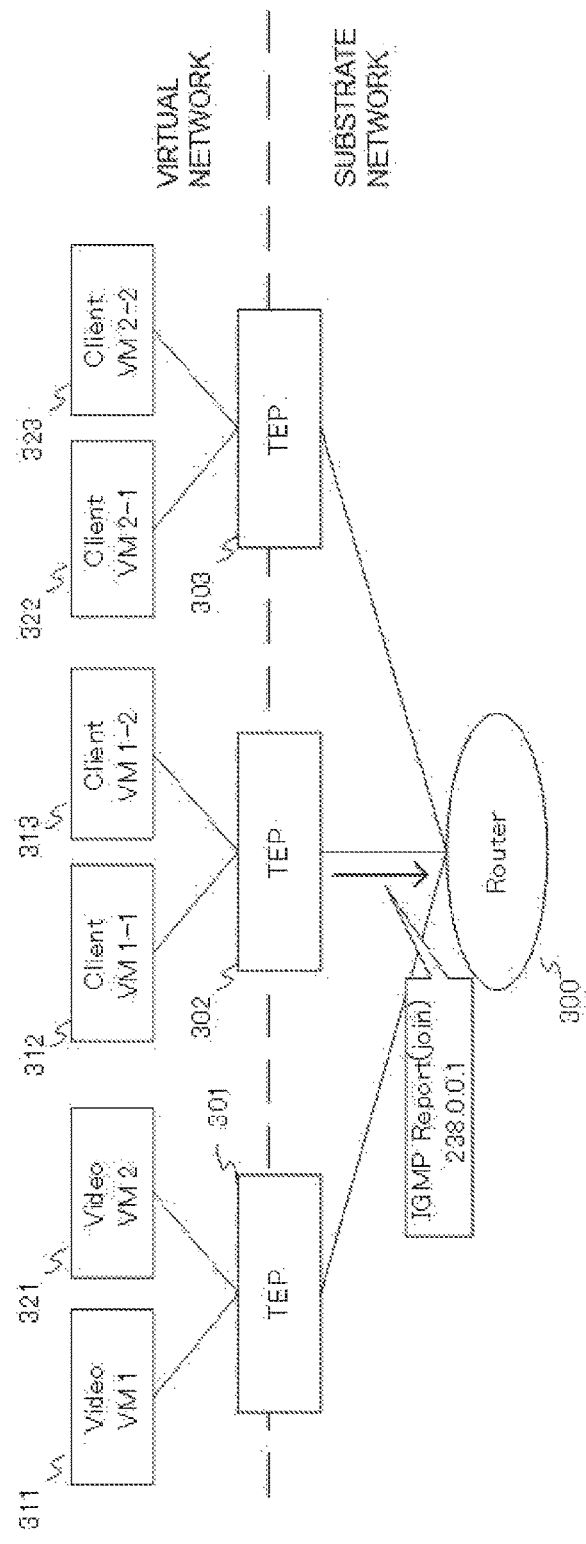
FIG. 17 illustrates a specific example of an operation performed by the packet forwarding apparatus according to the first exemplary embodiment of the present invention (transmitting a report (join) message again based on a mapping information arbitration result).

Next, a specific example of arbitration of mapping information will be described with reference to FIGS. 15 to 17. The following description will be made assuming that the client 313 joins the group whose multicast address is 225.0.0.1 after the client 312 leaves the group. At this point, since the corresponding mapping information has already been deleted, the TEP (packet forwarding apparatus) 302 newly maps the multicast address with 238.0.0.3. As illustrated in FIG. 15, the TEP (packet forwarding apparatus) 302 transmits a mapping information sharing message "Shared Inner 225.0.0.1 Outer 238.0.0.3" to the TEPs (packet forwarding apparatuses) 301 and 303 (see FIG. 15). However, since the TEP (packet forwarding apparatus) 301 still recognizes that a host (the streaming server 311 in this case) actually belongs to this group and holds the corresponding mapping information, the mapping information sharing message collides with the corresponding mapping information. In this case, the TEP (packet forwarding apparatus) 301 selects mapping information having a higher priority based on the above arbitration rule or arbitration algorithm. The following description will be described assuming that 238.0.0.1 has a higher priority based on the order of the multicast addresses. The TEP (packet forwarding apparatus) 301 transmits a mapping information sharing message "Shared Inner 225.0.0.1 Outer 238.0.0.1" to the TEPs (packet forwarding apparatuses) 302 and 303 (see FIG. 16). In this way, the TEP (packet forwarding apparatus) 302 updates its mapping information. Subsequently, the TEP (packet forwarding apparatus) 302 can achieve consistency by allowing the client 313 to join the multicast group (see FIG. 17).

In the above specific examples, the multicast router 300 is used. However, a group of multicast routers may be used. The multicast routers 300 may be realized as a group of network apparatuses including L2 switches that can determine the communication range of an IGMP message by using IGMP snooping, CGMP (Cisco Group Management Protocol), or the like.

Advantageous effects of the present exemplary embodiment will be summarized. As described above, by adding a function of mapping virtual-network and substrate-network multicast addresses to TEPs (packet forwarding apparatuses), the virtual-network multicast space can be mapped with the substrate-network multicast space. Thus, the line utilization range of a multicast communication can be limited within a necessary range. As a result, the line utilization efficiency of the communication is improved. In addition, as a secondary effect, virtual-network multicast communications can be sorted by substrate-network-side multicast addresses. Thus, by using the difference in multicast address, a load balancing function and a QoS control function can be enabled on the substrate network. In addition, the difference in address can be used for failure analysis, performance analysis, etc. on the substrate network.

SECOND EXEMPLARY EMBODIMENT

Figure 18:
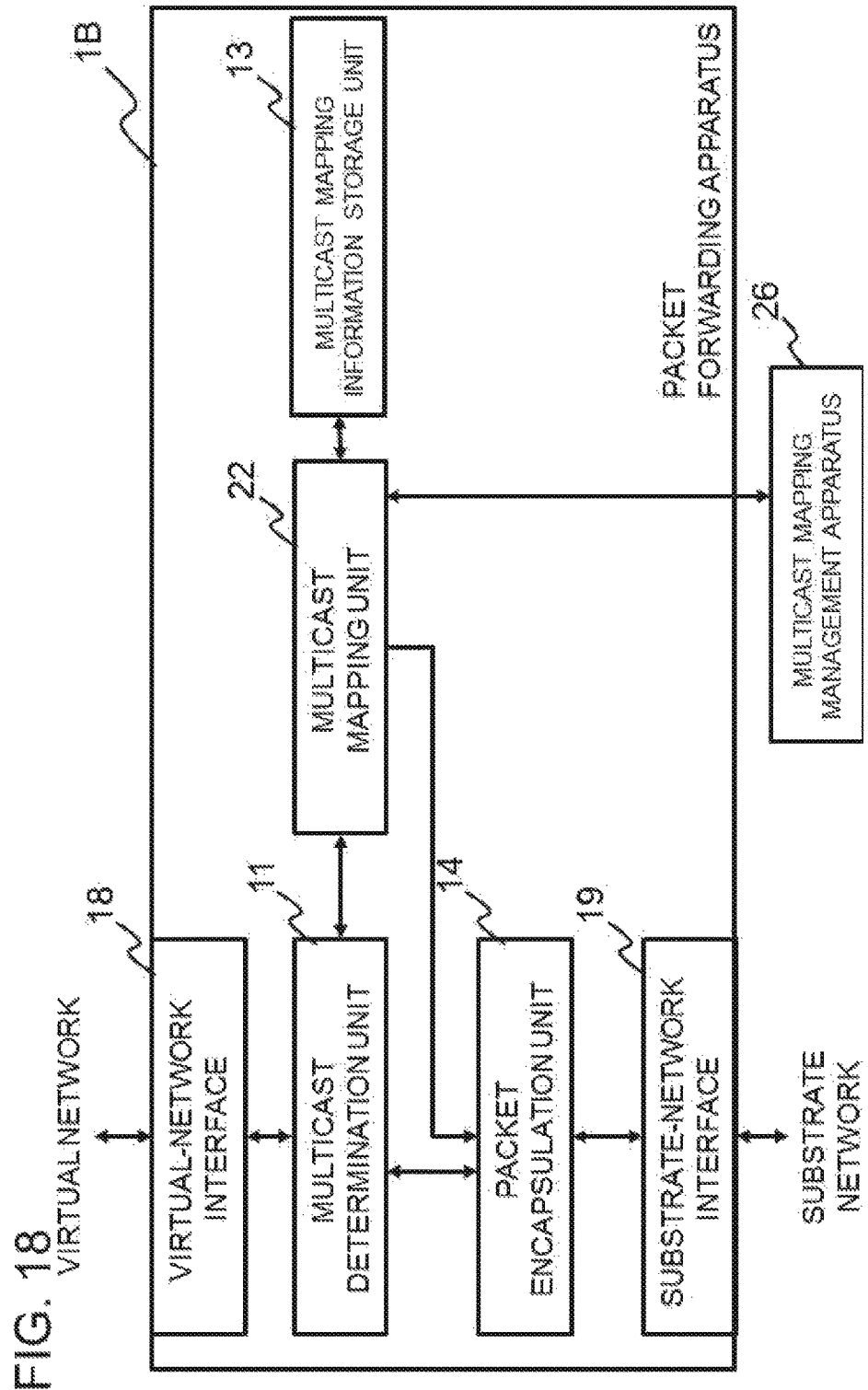
FIG. 18 illustrates a configuration of a packet forwarding apparatus and a multicast mapping management apparatus according to a second exemplary embodiment of the present invention.

Next, a second exemplary embodiment will be described in detail with reference to the drawings. In the second exemplary embodiment, there is added an apparatus that manages the mapping information and the member information in a centralized manner in place of individual packet forwarding apparatuses. FIG. 18 illustrates a configuration of a packet forwarding apparatus 1B and a multicast mapping management apparatus 26 according to the second exemplary embodiment of the present invention. As illustrated in FIG. 18, in place of the multicast mapping information sharing unit 15, the multicast mapping management apparatus 26 is added outside the packet forwarding apparatus 1B. Since other elements of the packet forwarding apparatus 1B are approximately the same as those of the packet forwarding apparatus 1 according to the first exemplary embodiment, the following description will be made with a focus on the difference.

When a multicast mapping unit 22 according to the second exemplary embodiment needs to create mapping information, the multicast mapping unit 22 transmits a query about the mapping information to the multicast mapping management apparatus 26.

In addition, when the multicast mapping unit 22 according to the second exemplary embodiment needs to delete mapping information, the multicast mapping unit 22 requests the multicast mapping management apparatus 26 to delete the mapping information.

By using mapping information as illustrated in FIG. 19, the multicast mapping management apparatus 26 performs maintenance and management of mapping information in which member information is associated with virtual-network and substrate-network multicast addresses. For example, when the multicast mapping management apparatus 26 is requested about a query about mapping information by the multicast mapping unit 22 in an arbitrary packet forwarding apparatus such as the packet forwarding apparatus 1B, if the multicast mapping management apparatus 26 does not hold the corresponding mapping information, the multicast mapping management apparatus 26 selects an arbitrary one of the multicast addresses that can be used in the substrate network and creates mapping information in which the virtual-network multicast address of the requesting packet forwarding apparatus is associated with the selected multicast address. In addition, the requesting member is added to the corresponding member field in the created mapping information. Next, the multicast mapping management apparatus 26 notifies the multicast mapping unit 22 in the requesting packet forwarding apparatus of the created mapping information.

In addition, when the multicast mapping management apparatus is requested about a query about mapping information by the multicast mapping unit 22 in an arbitrary packet forwarding apparatus, if the multicast mapping management apparatus 26 holds the corresponding mapping information, the multicast mapping management apparatus 26 adds the requesting member to the member field in the mapping information. Next, the multicast mapping management apparatus 26 notifies the multicast mapping unit 22 in the requesting packet forwarding apparatus of the mapping information.

In addition, when the multicast mapping management apparatus 26 is requested by the multicast mapping unit 22 in an arbitrary packet forwarding apparatus to delete mapping information, the multicast mapping management apparatus 26 deletes the requesting member from the member field in the held mapping information. If all the members in the member field in the mapping information have been deleted, the multicast mapping management apparatus 26 deletes the mapping information.

The above query about and deletion of mapping information can be realized by using a substrate-network communication.

As described above, since the multicast mapping management apparatus 26 that manages mapping management information in a centralized manner is arranged, the packet forwarding apparatuses do not need to perform the operations of sharing and arbitrating mapping information.

Figure 20:
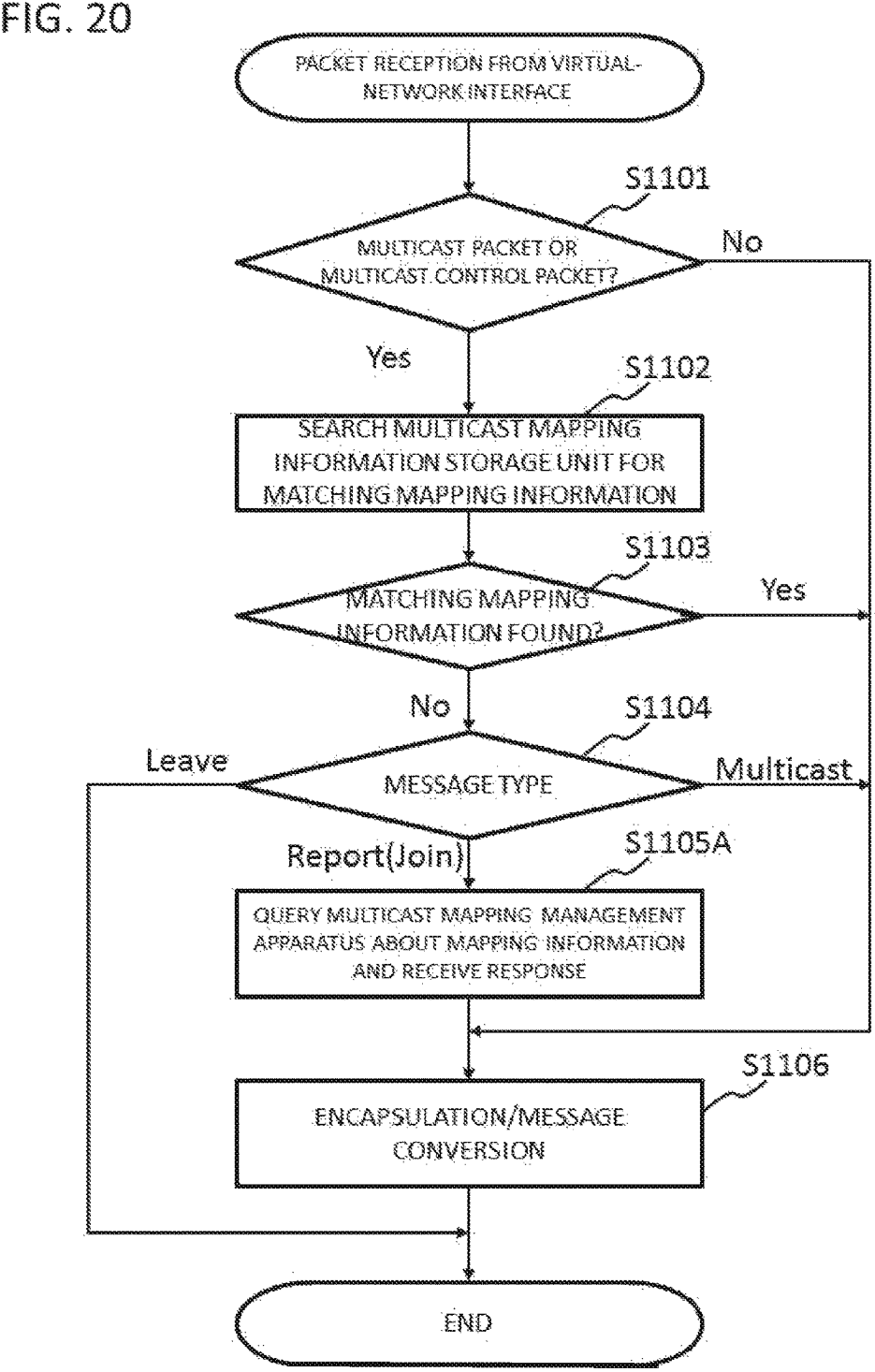
FIG. 20 is a flowchart illustrating an operation that the packet forwarding apparatus according to the second exemplary embodiment of the present invention performs (when receiving a packet via a virtual-network interface).

Next, an operation according to the present exemplary embodiment will be described in detail with reference to the drawings. FIG. 20 is a flowchart illustrating an operation that the packet forwarding apparatus 1B according to the second exemplary embodiment of the present invention performs (when receiving a packet via the virtual-network interface). The operation of the packet forwarding apparatus illustrated in FIG. 20 can be illustrated by a flowchart similar to that illustrated in FIG. 4. The difference is that the creation and sharing of mapping information in step S1105 is replaced by querying the multicast mapping management apparatus 26 about mapping information and receiving a response from the multicast mapping management apparatus 26 (see step S1105A).

Figure 21:
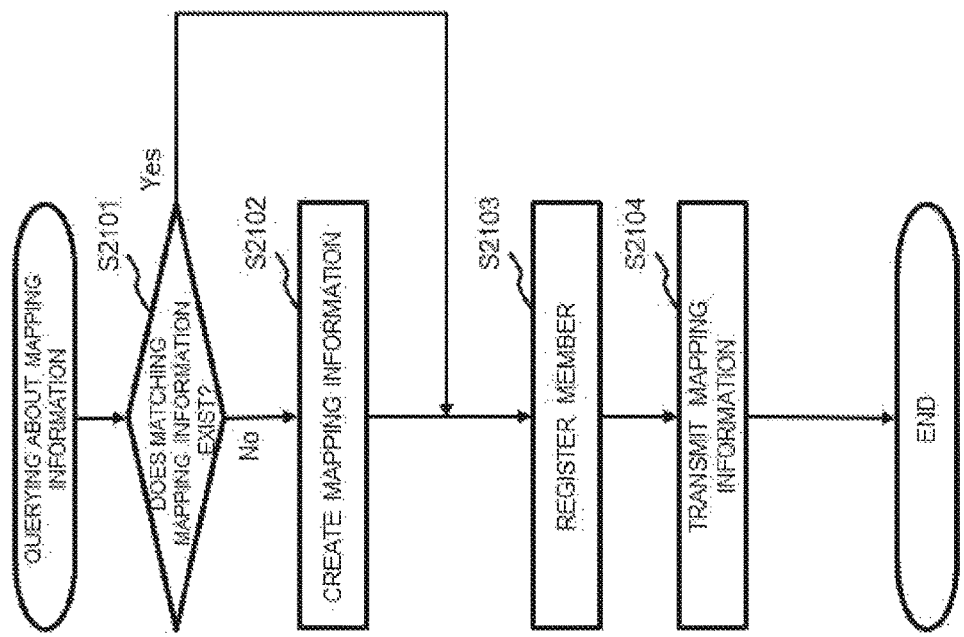
FIG. 21 is a flowchart illustrating an operation that the multicast mapping management apparatus according to the second exemplary embodiment of the present invention performs (when receiving a query about mapping information).

FIG. 21 is a flowchart illustrating the operation that the multicast mapping management apparatus according to the second exemplary embodiment of the present invention performs (when receiving a query about mapping information). As illustrated in FIG. 20, when the multicast mapping unit 22 receives a multicast report (join) message, the multicast mapping unit 22 determines whether there is mapping information that corresponds to the multicast address specified in this multicast report (join) message. If the multicast mapping unit 22 cannot find the mapping information, the multicast mapping unit 22 queries the multicast mapping management apparatus 26 about the mapping information (starts the processing in FIG. 21). The query information includes at least a virtual network identifier and a virtual network multicast address.

If the multicast mapping management apparatus 26 does not hold mapping information that corresponds to the virtual-network multicast address of the requesting packet forwarding apparatus (No in step S2101), the multicast mapping management apparatus 26 selects an arbitrary multicast address from among the multicast addresses that can be used in the substrate network and creates mapping information in which the selected multicast address is associated with the virtual-network multicast address of the requesting packet forwarding apparatus (step S2102 in FIG. 21).

Next, the multicast mapping management apparatus 26 registers an identifier of the requesting packet forwarding apparatus as a member (user) in association with the existing mapping information (Yes in step S2101) or the mapping information created in step S2102 (step S2103).

Next, the multicast mapping management apparatus 26 transmits the existing mapping information (Yes in step S2101) or the mapping information created in step S2102 to the multicast mapping unit 22 in the requesting packet forwarding apparatus (step S2104).

When receiving the mapping information, the multicast mapping unit 22 stores the mapping information in the multicast mapping information storage apparatus 13. Next, based on the received packet and mapping information, the multicast mapping unit 22 requests the packet encapsulation unit 14 to convert the packet message (step S1106 in FIG. 20).

As described above, the multicast mapping unit 22 can leave creation and sharing of mapping information to the multicast mapping management apparatus 26.

Figure 22:
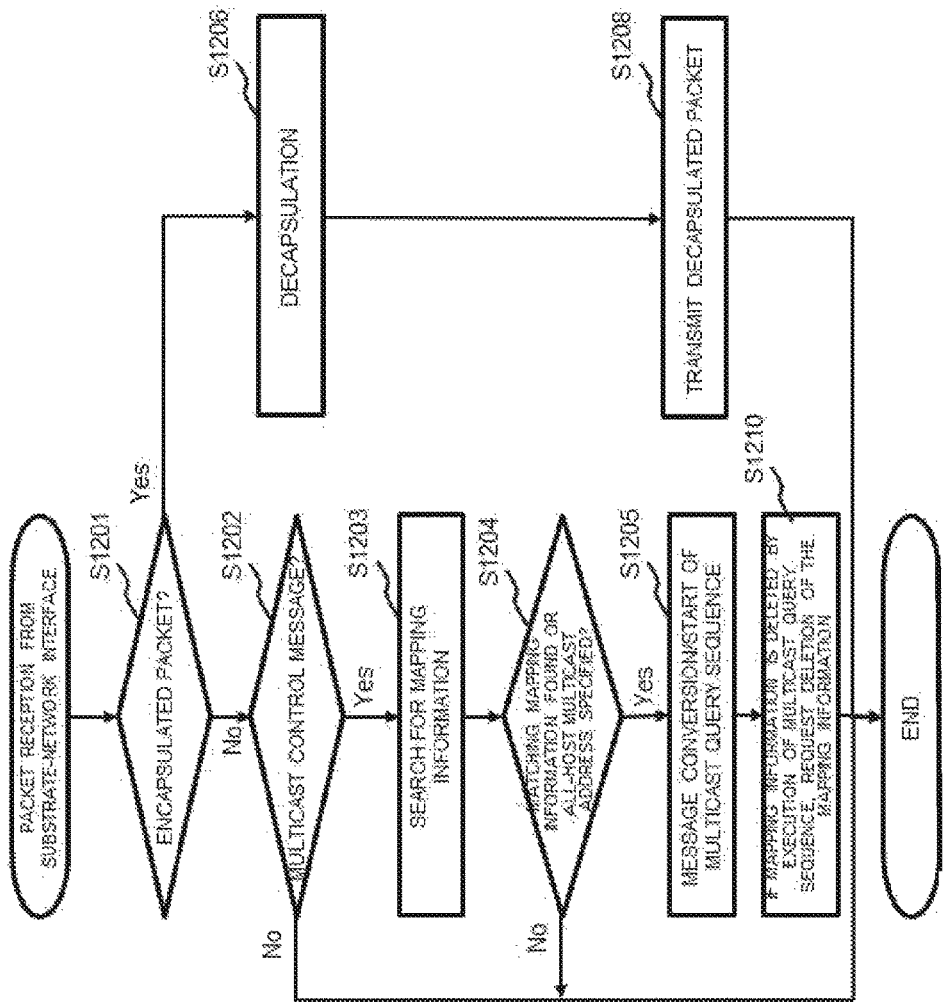
FIG. 22 is a flowchart illustrating an operation that the packet forwarding apparatus according to the second exemplary embodiment of the present invention performs (when receiving a packet via a substrate-network interface).

Next, an operation that the packet forwarding apparatus 1B performs when receiving a packet from the substrate-network interface 19 will be described. FIG. 22 is a flowchart illustrating an operation that the packet forwarding apparatus according to the second exemplary embodiment of the present invention performs (when receiving a packet via the substrate-network interface). The present operation differs from the operation performed by the packet forwarding apparatus according to the first exemplary embodiment in FIG. 5. First, the mapping information arbitration processing in step 1209 in FIG. 5 is deleted. Second, the flowchart in FIG. 22 includes step S1210 in which, if mapping information in its corresponding apparatus is deleted as a result of execution of the multicast query sequence in step S1205, the multicast mapping unit 22 requests the multicast mapping management apparatus 26 to delete the mapping information.

As in the above first exemplary embodiment, in the present exemplary embodiment, if the multicast mapping unit 22 detects a multicast group that does not have any members, the multicast mapping unit 22 deletes the corresponding mapping information from the multicast mapping information storage unit 13. Next, the multicast mapping unit 22 requests the multicast mapping management apparatus 26 to delete the mapping information (starts the processing in FIG. 23). A request for deleting the mapping information includes at least the mapping information deleted from the packet forwarding apparatus 1B.

Figure 23:
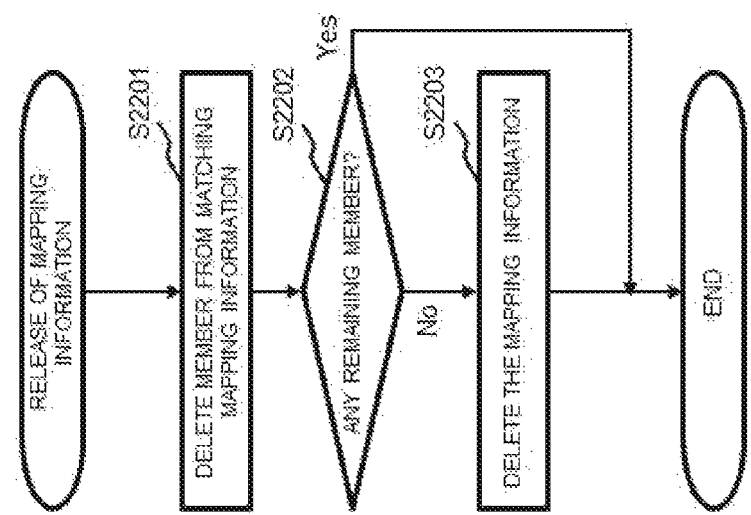
FIG. 23 is a flowchart illustrating an operation that the multicast mapping management apparatus according to the second exemplary embodiment of the present invention performs (when receiving a mapping information deletion request).

FIG. 23 is a flowchart illustrating an operation that the multicast mapping management apparatus performs when receiving a mapping information deletion request. As illustrated in FIG. 23, the multicast mapping management apparatus 26 deletes the identifier of the requesting packet forwarding apparatus registered as a member (user) from the corresponding member field in the mapping information held in the multicast mapping management apparatus 26 (step S2201).

Next, if the member field in the mapping information from which the member (user) has been deleted does not have any members (No in step S2202), the multicast mapping management apparatus 26 deletes the mapping information (step S2203).

Through the above processing, mapping information that is not necessary in the multicast mapping management apparatus 26 is organized.

Next, a specific operation according to the second exemplary embodiment will be described with reference to FIGS. 24 to 30. As in the first exemplary embodiment, a Video VM 1 and a Video VM 2 are streaming servers, and Client VMs 1-1, 1-2, 2-1, and 2-2 are clients that receive streaming data from these streaming servers. A router 400 is a multicast router having an IP multicast function. In addition, TEPs (apparatuses) 401 to 403 in FIGS. 24 to 30 are each configured by the packet forwarding apparatus 1B according to the second exemplary embodiment. A large difference from the first exemplary embodiment is that a connection server 409 serving as the multicast mapping management apparatus 26 is added.

Hereinafter, as representations of new messages, a query about mapping information is represented as "Shared query [virtual network multicast address]" and a response to the query is represented as "Shared map [virtual network multicast address] [substrate network multicast address]." For clarity, the following description will be made assuming that a single virtual network will be used and the message representation thereof will be omitted. In addition, since representations of the other terms and messages are the same as those in the first exemplary embodiment, description thereof will be omitted.

Figure 24:
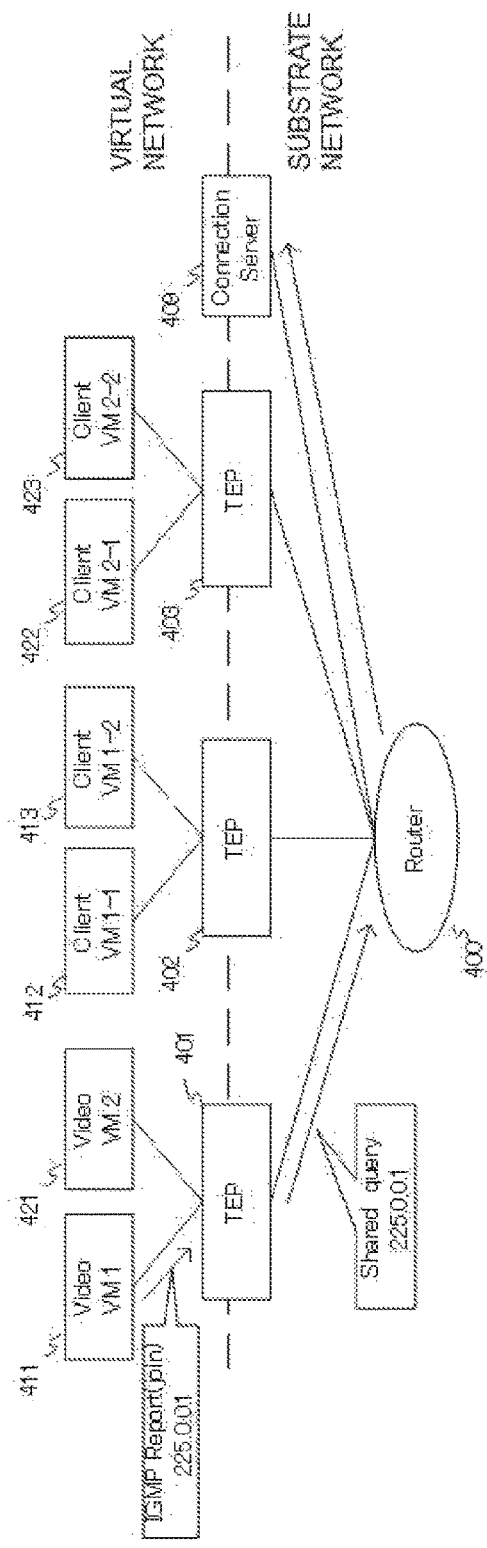
FIG. 24 illustrates a specific example of an operation performed by the multicast mapping management apparatus according to the second exemplary embodiment of the present invention (a query about a substrate-network multicast address).
Figure 25:
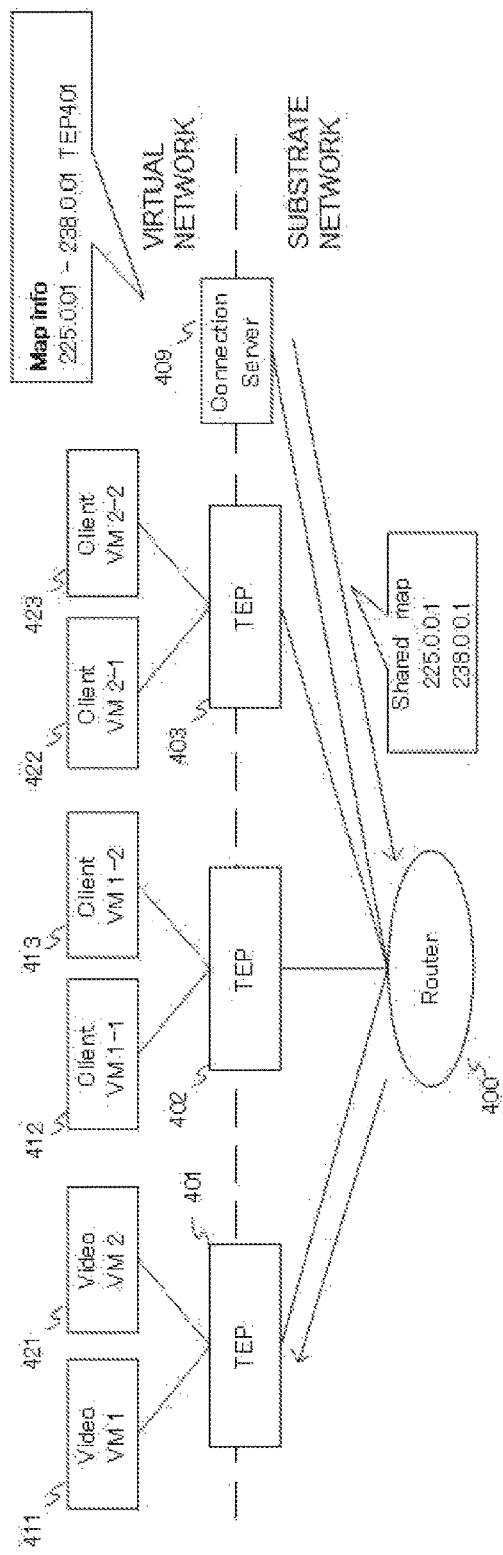
FIG. 25 illustrates a specific example of an operation performed by the packet forwarding apparatus according to the second exemplary embodiment of the present invention (a response of a substrate-network multicast address).
Figure 26:
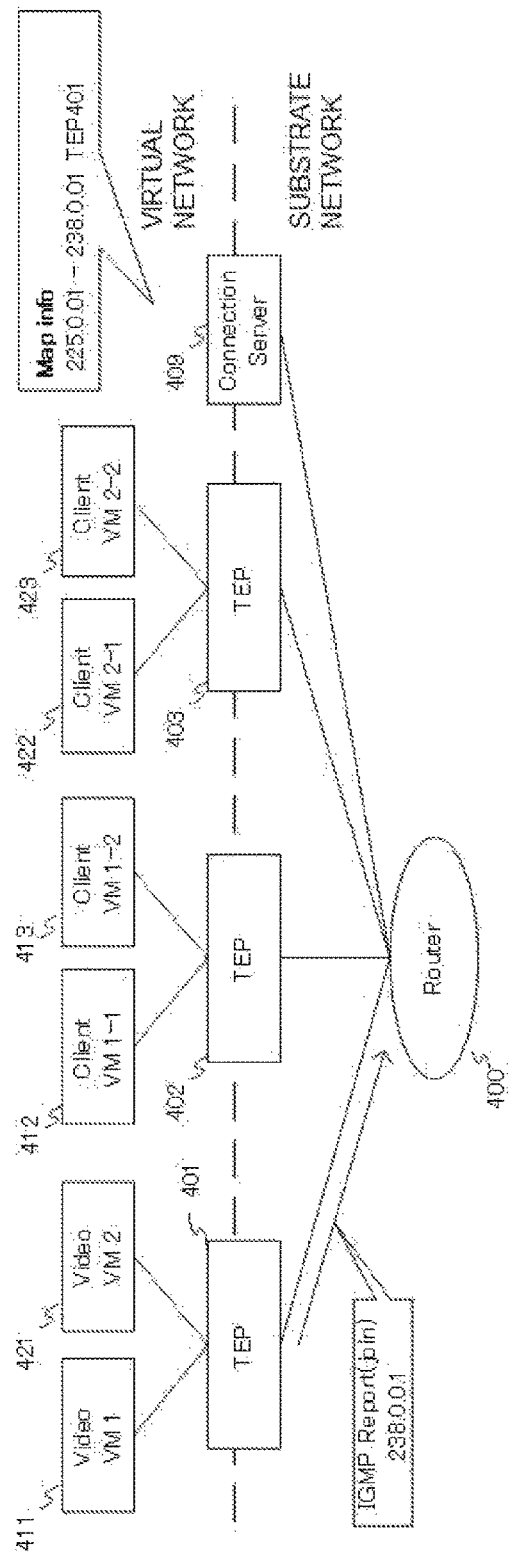
FIG. 26 illustrates a specific example of an operation performed by the packet forwarding apparatus according to the second exemplary embodiment of the present invention (forwarding of a multicast report (join) message).
Figure 27:
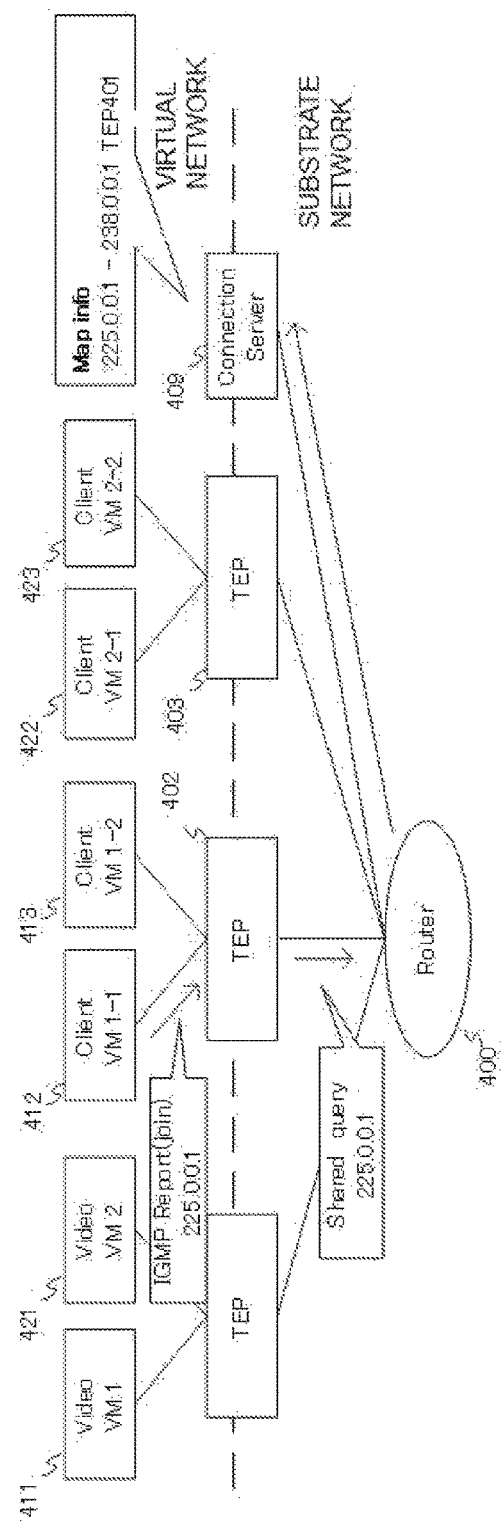
FIG. 27 illustrates a specific example of an operation performed by the packet forwarding apparatus according to the second exemplary embodiment of the present invention (a query about a substrate-network multicast address (for a client)).
Figure 28:
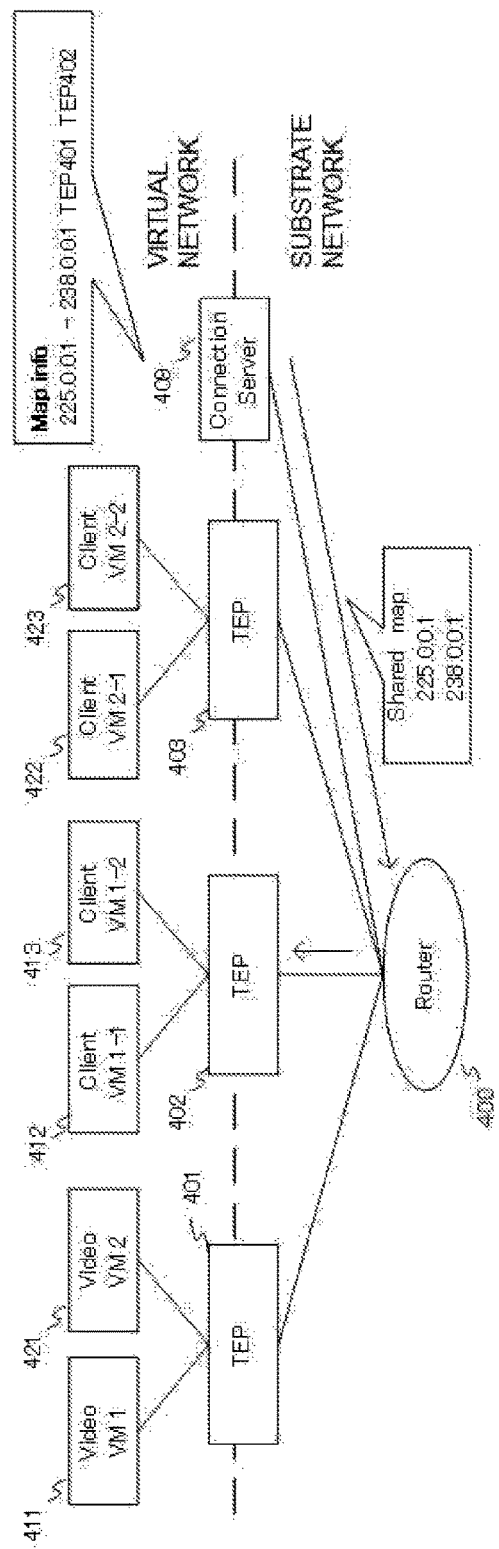
FIG. 28 illustrates a specific example of an operation performed by the packet forwarding apparatus according to the second exemplary embodiment of the present invention (a response of a substrate-network multicast address (for the client)).
Figure 29:
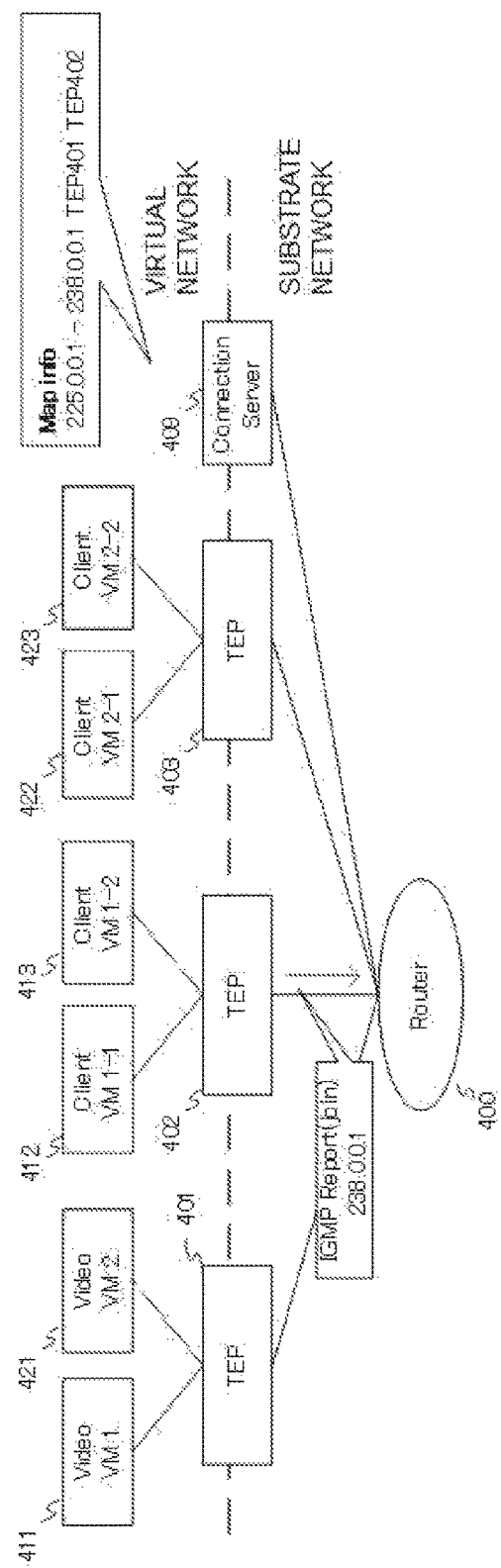
FIG. 29 illustrates a specific example of an operation performed by the packet forwarding apparatus according to the second exemplary embodiment of the present invention (forwarding of a multicast report (join) message (for the client)).

As illustrated in FIG. 24, if the streaming server 411 wishes to join a multicast group with 225.0.0.1 ("IGMP Report (join) 225.0.0.1"), the TEP (packet forwarding apparatus) 401 performs multicast address mapping processing. However, at this point, the TEP (packet forwarding apparatus) 401 does not hold the corresponding mapping information, the multicast mapping unit 22 in the TEP (packet forwarding apparatus) 401 queries the connection server 409 about the mapping information by transmitting a query message "Shared query 225.0.0.1" (see FIG. 24).

Since the connection server 409 does not hold the corresponding mapping information, the connection server 409 selects 238.0.0.1 as a multicast address that can be used in the substrate network and creates mapping information (No in step S2101 and S2102 in FIG. 21). In addition, the connection server 409 stores the TEP (packet forwarding apparatus) 401 as a member in the created mapping information (step S2103). When transmitting the created mapping information to the TEP (packet forwarding apparatus) 401, the connection server 409 creates and transmits a mapping information response message "Shared map 225.0.0.1 238.0.0.1" (see FIG. 25).

When receiving the mapping information, the TEP (packet forwarding apparatus) 401 stores the mapping information in its own multicast mapping information storage unit 13. In addition, the TEP (packet forwarding apparatus) 401 converts the report (join) message into "IGMP Report (join) 238.0.0.1" and transmits the message to the substrate network. As a result, the TEP (packet forwarding apparatus) 401 has joined the multicast address 238.0.0.1 in the substrate network (see FIG. 26).

Subsequently, if the client 412 wishes to join the multicast group with 225.0.0.1 ("IGMP Report (join) 225.0.0.1"), the TEP (packet forwarding apparatus) 402 performs multicast address mapping processing. However, at this point, the TEP (packet forwarding apparatus) 402 does not hold the corresponding mapping information. Thus, the multicast mapping unit 22 in the TEP (packet forwarding apparatus) 402 queries the connection server 409 about the mapping information by transmitting a query message "Shared query 225.0.0.1" (see FIG. 27).

When receiving the query message, since the connection server 409 holds the corresponding mapping information, the connection server 409 adds the TEP (packet forwarding apparatus) 402 as a member in the corresponding mapping information (see No in step S2101 and S2103 in FIG. 21 and the first entry in FIG. 19). When transmitting the mapping information to the TEP (packet forwarding apparatus) 402, the connection server 409 creates and transmits a mapping information response message "Shared map 225.0.0.1 238.0.0.1" (see FIG. 28).

When receiving the mapping information, the TEP (packet forwarding apparatus) 402 stores the mapping information in its multicast mapping information storage unit 13. In addition, the TEP (packet forwarding apparatus) 402 converts the report (join) message into "IGMP Report (join) 238.0.0.1" and transmits the converted message to the substrate network. As a result, the TEP (packet forwarding apparatus) 402 has joined the substrate-network multicast address 238.0.0.1 (see FIG. 29).

Figure 30:
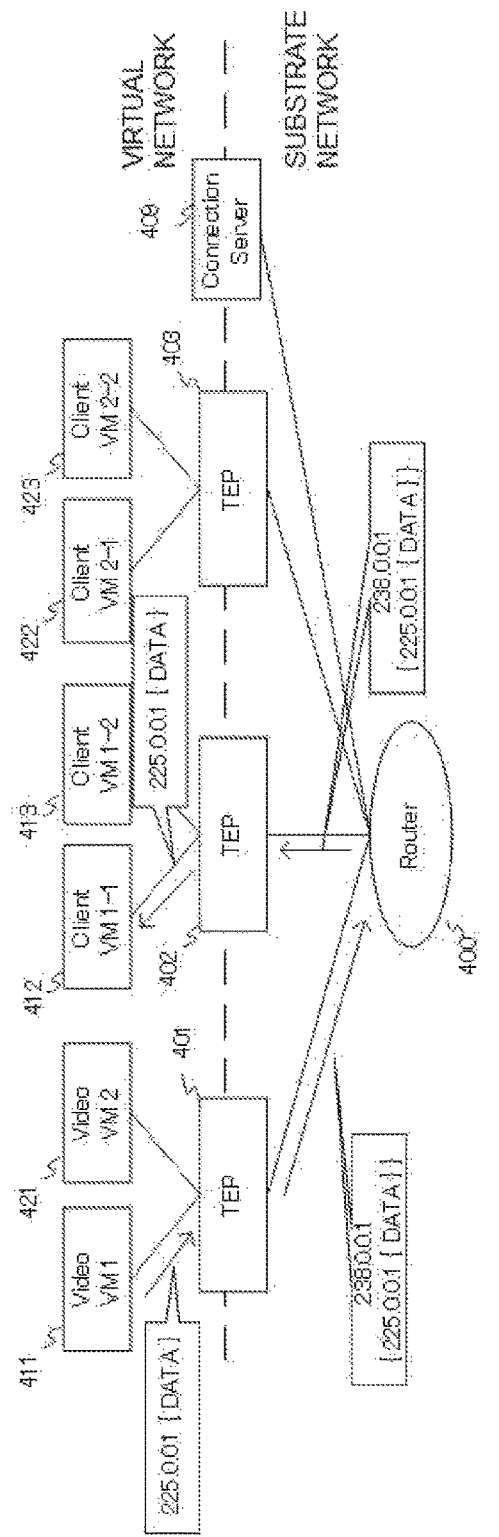
FIG. 30 illustrates a specific example of an operation performed by the packet forwarding apparatus according to the second exemplary embodiment of the present invention (forwarding of multicast data to a member in a group).

Through the above processing, the subsequent multicast communication using 225.0.0.1 from the streaming server 411 is encapsulated by the entry-side TEP (packet forwarding apparatus) 401 with the substrate-network multicast address and is then forwarded to the destination TEP (packet forwarding apparatus) 402, which decapsulates and forwards the packet to the client (see FIG. 30).

As described above, according to the present exemplary embodiment, in addition to the advantageous effects provided by the first exemplary embodiment, the load needed for sharing mapping information and arbitration can be reduced. This is because the multicast mapping management apparatus 26 that manages mapping information in a centralized manner is arranged.

THIRD EXEMPLARY EMBODIMENT

Figure 31:
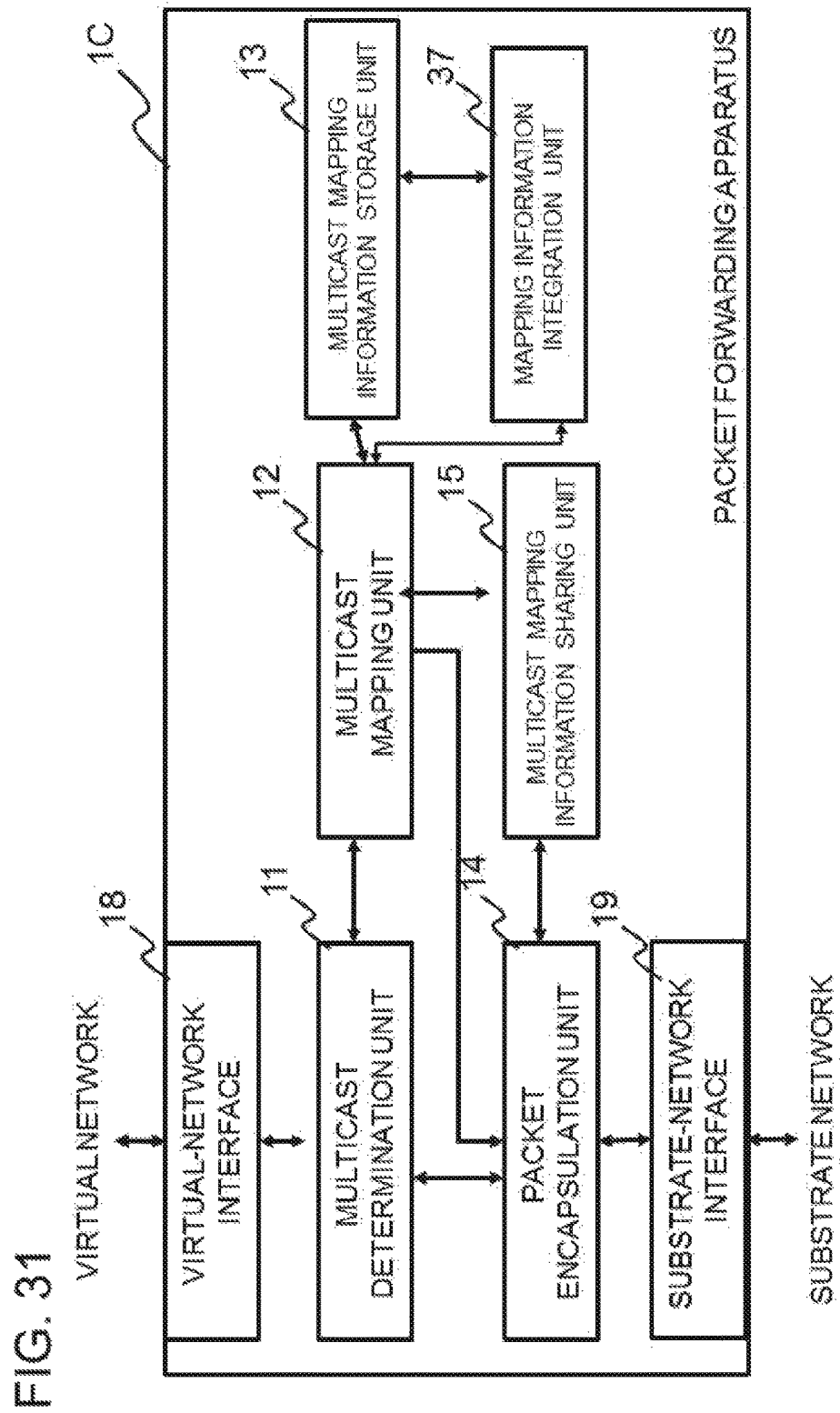
FIG. 31 illustrates a configuration of a packet forwarding apparatus according to a third exemplary embodiment according to the present invention.

Next, a third exemplary embodiment in which a mapping information integration function is added to the above first exemplary embodiment will be described. FIG. 31 illustrates a configuration of a packet forwarding apparatus according to the third exemplary embodiment of the present invention. As illustrated in FIG. 31, the configuration includes a mapping information integration unit 37 in addition to the configuration of the packet forwarding apparatus according to the first exemplary embodiment in FIG. 2.

When a predetermined event occurs, the mapping information integration unit 37 integrates mapping information held in the multicast mapping information storage unit 13.

Based on information about packet forwarding apparatuses sharing preset mapping information, the multicast mapping unit 12 performs registration and deletion of multicast information in synchronization with a different packet forwarding apparatus(es) via the multicast mapping information sharing unit 15.

The mapping information integration unit 37 refers to the multicast mapping information storage unit 13, searches for pieces of mapping information each including the same packet forwarding apparatuses, and integrates the found pieces of mapping information together. In addition, if the mapping information is integrated, the mapping information integration unit 37 notifies the multicast mapping unit 12 of the mapping information changed as a result of the integration.

Hereinafter, cases in which mapping information can be integrated will be described.
(1) If pieces of mapping information have the same multicast communication range, the substrate-network multicast addresses can be integrated into one of the substrate-network multicast addresses.
(2) If the multicast communication range of a piece of mapping information is narrower than that of a different piece of mapping information, the substrate-network multicast addresses of these pieces of mapping information can be integrated into that of the different piece of mapping information.

In addition, examples of the predetermined event (integration timing) will be listed as follows:
(1) a regular check;
(2) when the substrate multicast addresses are depleted or when the number of usable substrate multicast addresses reaches a certain number or less; and
(3) when mapping information is updated.

When the multicast mapping unit 12 is notified by the mapping information integration unit 37 of mapping information changed by the integration, the multicast mapping unit 12 updates the mapping information in the multicast mapping information storage unit 13 and requests a different packet forwarding apparatus(es) to synchronize and update the corresponding mapping information via the multicast mapping information sharing unit 15. In addition, based on the mapping information changed by the integration, the multicast mapping unit 12 changes a multicast report (join) address.

In addition, if the multicast mapping unit 12 cannot find any mapping information that uses the same substrate multicast address after the change of the report (join) address, the multicast mapping unit 12 outputs a leave message in which the substrate multicast address is set.

As described above, according to the present exemplary embodiment, it is possible to reduce the chance of depletion of substrate multicast addresses, in addition to the advantageous effects provided by the first exemplary embodiment.

FOURTH EXEMPLARY EMBODIMENT

Figure 32:
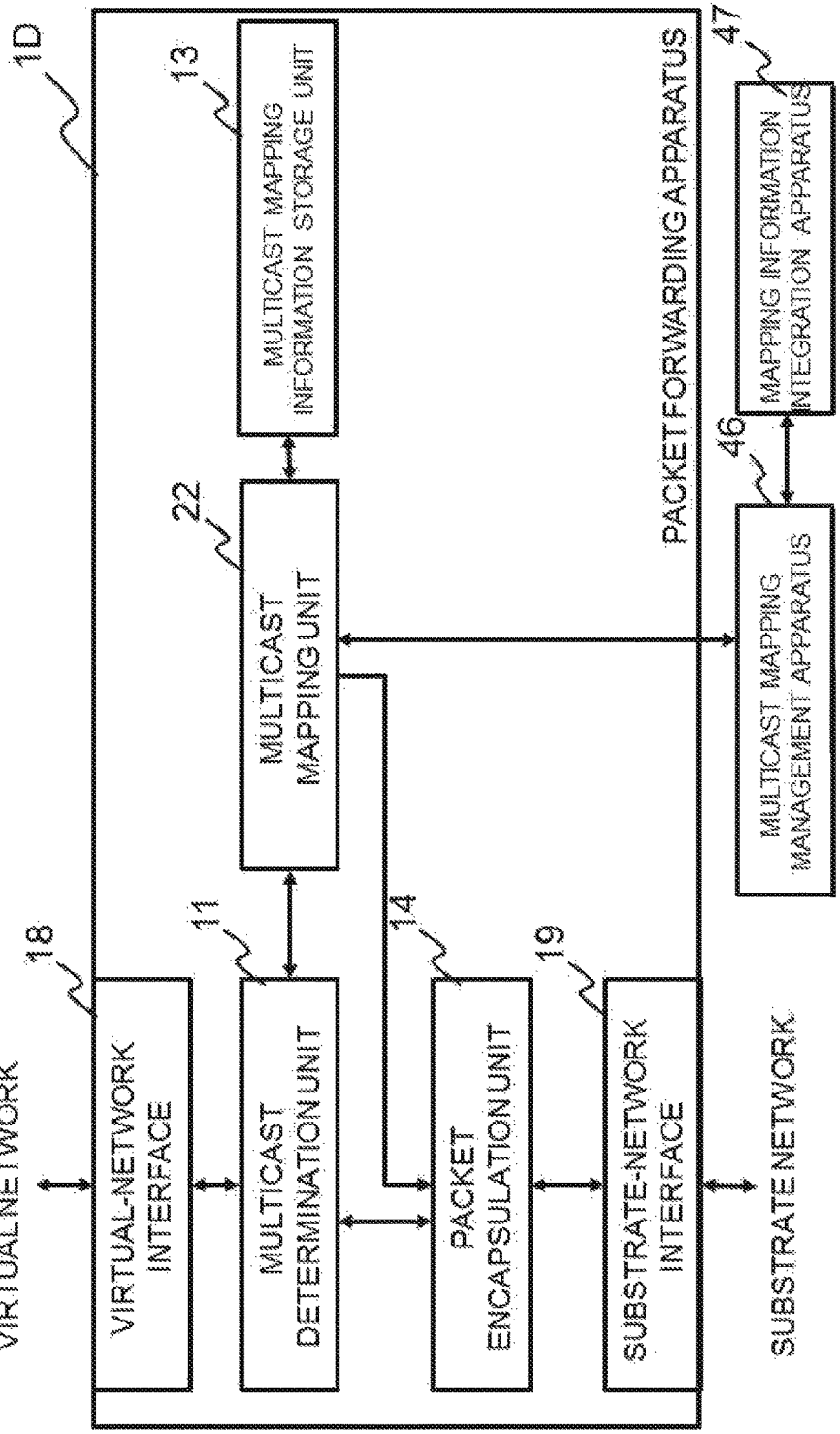
FIG. 32 illustrates a configuration of a packet forwarding apparatus according to a fourth exemplary embodiment according to the present invention.

Next, a fourth exemplary embodiment obtained by adding the mapping information integration function to the above second exemplary embodiment will be described. FIG. 32 illustrates a configuration of a packet forwarding apparatus and external apparatuses according to the fourth exemplary embodiment of the present invention. As illustrated in FIG. 32, a mapping information integration apparatus 47 is added to the configuration in which a packet forwarding apparatus 1D and a multicast mapping management apparatus 46 are connected to each other that are configured as illustrated in FIG. 18. In the example in FIG. 32, the multicast mapping management apparatus 46 and the mapping information integration apparatus 47 are illustrated as separate apparatuses. However, these apparatuses may be integrated and configured as a single apparatus.

The mapping information integration apparatus 47 acquires mapping information from the multicast mapping management apparatus 46 and searches for pieces of mapping information having the same packet forwarding apparatuses participating in respective groups. If the mapping information integration apparatus 47 finds such pieces of mapping information, the mapping information integration apparatus 47 requests the multicast mapping management apparatus 46 to integrate the mapping information.

If the multicast mapping management apparatus 46 integrates the mapping information, the multicast mapping management apparatus 46 notifies a multicast mapping unit(s) 22 in a different packet forwarding apparatus(es) affected by the integration of the mapping information of the mapping information changed as a result of the integration.

When notified, the multicast mapping unit(s) 22 updates the mapping information in the multicast mapping information storage unit(s) 13. In addition, based on the changed mapping information, the multicast mapping unit(s) 22 changes a multicast report (join) address.

Next, a specific operation performed by this configuration according to the fourth exemplary embodiment will be described with reference to FIGS. 33 to 36. As in the first exemplary embodiment, a Video VM 1, a Video VM 2, and a Video VM 3 are streaming servers, and Client VMs 1-1, 2-1, 2-2, and 3-1 are clients that receive streaming data from these streaming servers. A router 500 is a multicast router having an IP multicast function. In addition, TEPs (apparatuses) 501 to 503 in FIGS. 33 to 36 are each configured by the packet forwarding apparatus 1D according to the fourth exemplary embodiment. A connection server 509 serves as the multicast mapping management apparatus 46 and the mapping information integration apparatus 47. In addition, since representations of the other terms and messages are the same as those in the first exemplary embodiment, description thereof will be omitted.

Figure 33:
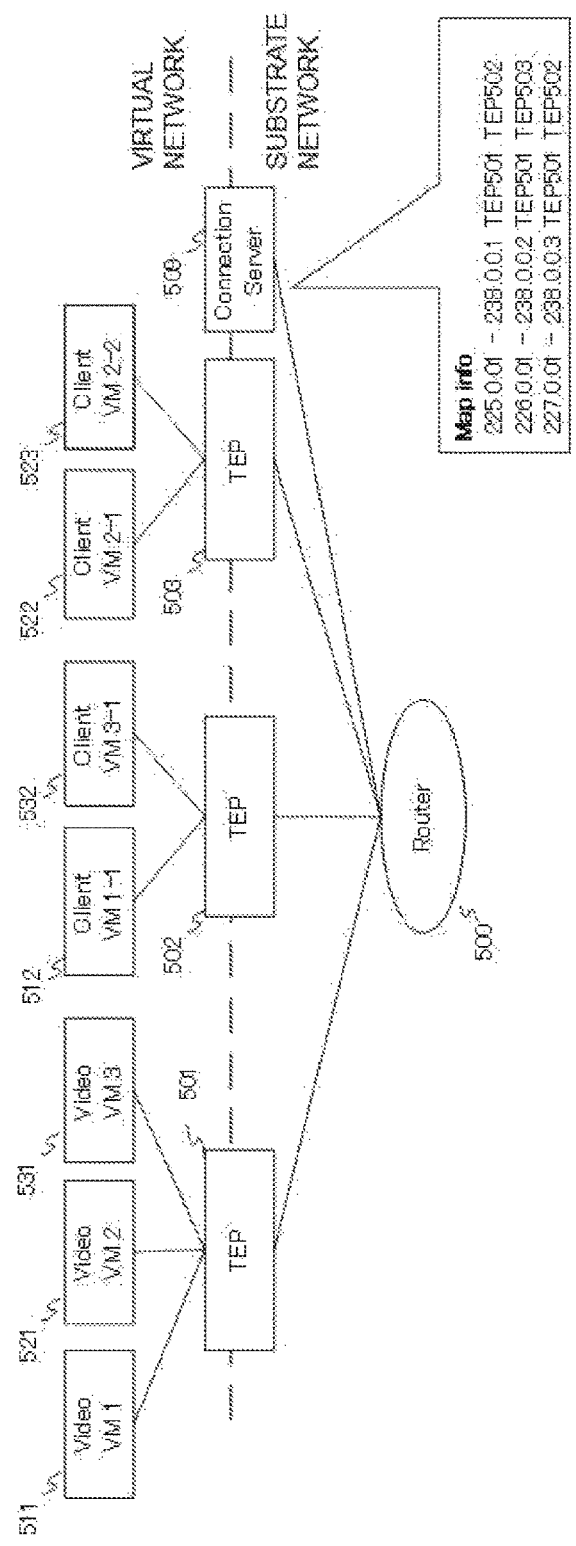
FIG. 33 illustrates a specific example of an operation of a mapping information integration unit according to the fourth exemplary embodiment of the present invention (an initial state).
Figure 34:
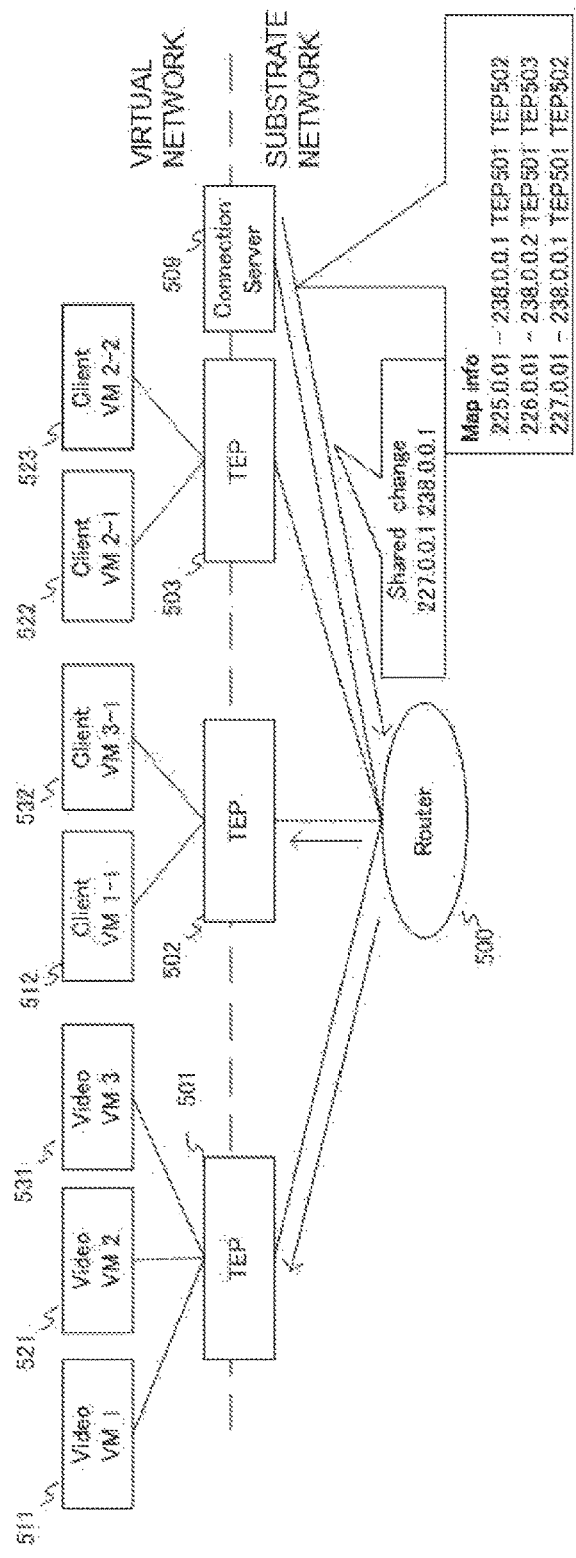
FIG. 34 illustrates a specific example of an operation of a mapping information integration unit according to the fourth exemplary embodiment of the present invention (sharing of integrated mapping information).

FIG. 33 illustrates mapping information held in the multicast mapping management apparatus 46 in the connection server 509 after multicast communication control for each streaming has been performed. Namely, 225.0.0.1 is mapped with 238.0.0.1, and the TEPs (packet forwarding apparatuses) 501 and 502 belong to this mapping information. In addition, 226.0.0.1 is mapped with 238.0.0.2, and the TEPs (packet forwarding apparatuses) 501 and 503 belong to this mapping information. In addition, 227.0.0.1 is mapped with 238.0.0.3, and the TEPs (packet forwarding apparatuses) 501 and 502 belong to this mapping information.

The mapping information integration apparatus 47 in the connection server 509 receives mapping information from the multicast mapping management apparatus 46 and searches for mapping information that can be integrated. As a result, in this example, since the members in the mapping information including 225.0.0.1 and the members in the mapping information including 227.0.0.1 are the same, the mapping information integration apparatus 47 determines that these pieces of mapping information can be integrated. The mapping information integration apparatus 47 in the connection server 509 selects these two pieces of mapping information as integration targets and requests the multicast mapping management apparatus 46 in the connection server 509 to integrate the mapping information. In this example, the mapping information integration apparatus 47 requests the multicast mapping management apparatus 46 to integrate the mapping information by changing the substrate multicast address in the mapping information including 227.0.0.1 into that in the mapping information including 225.0.0.1.

After integrating the mapping information, the multicast mapping management apparatus 46 in the connection server 509 transmits a mapping information update message "Shared change 227.0.0.1 238.0.0.1" to the TEPs (packet forwarding apparatuses) 501 and 502, which are the members in the mapping information before and after the integration. The multicast mapping units 22 in the TEPs (packet forwarding apparatuses) 501 and 502 update the corresponding mapping information, based on the mapping information update message. In this way, both of the encapsulation about 225.0.0.1 and the encapsulation about 227.0.0.1 are performed by using 238.0.0.1 (see FIG. 34).

Figure 35:
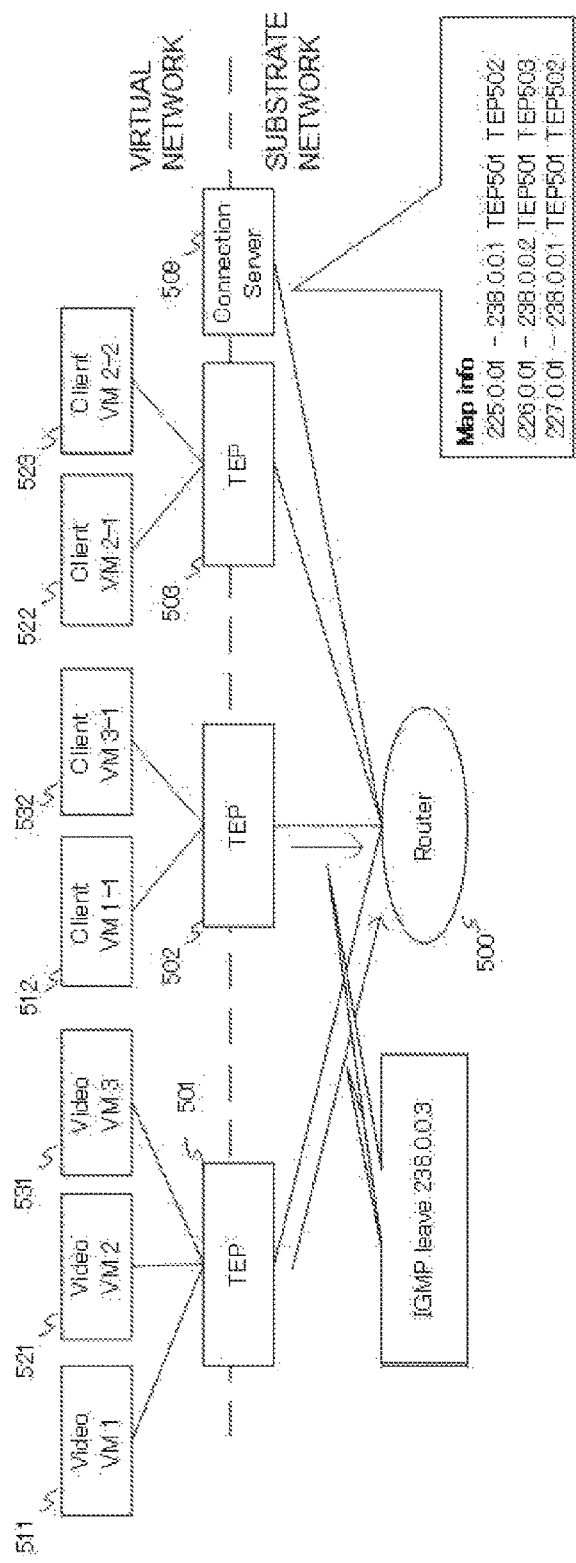
FIG. 35 illustrates a specific example of an operation of the packet forwarding apparatus according to the fourth exemplary embodiment of the present invention (forwarding of a multicast leave message from a client).

Subsequently, since the members corresponding to 238.0.0.3 used with the original 227.0.0.1 are deleted when the mapping information is updated, by transmitting a leave message "IGMP Leave 238.0.0.3" via the packet encapsulation units 14, the multicast mapping units 22 in the TEPs (packet forwarding apparatuses) 501 and 502 can start leave processing (see FIG. 35).

Figure 36:
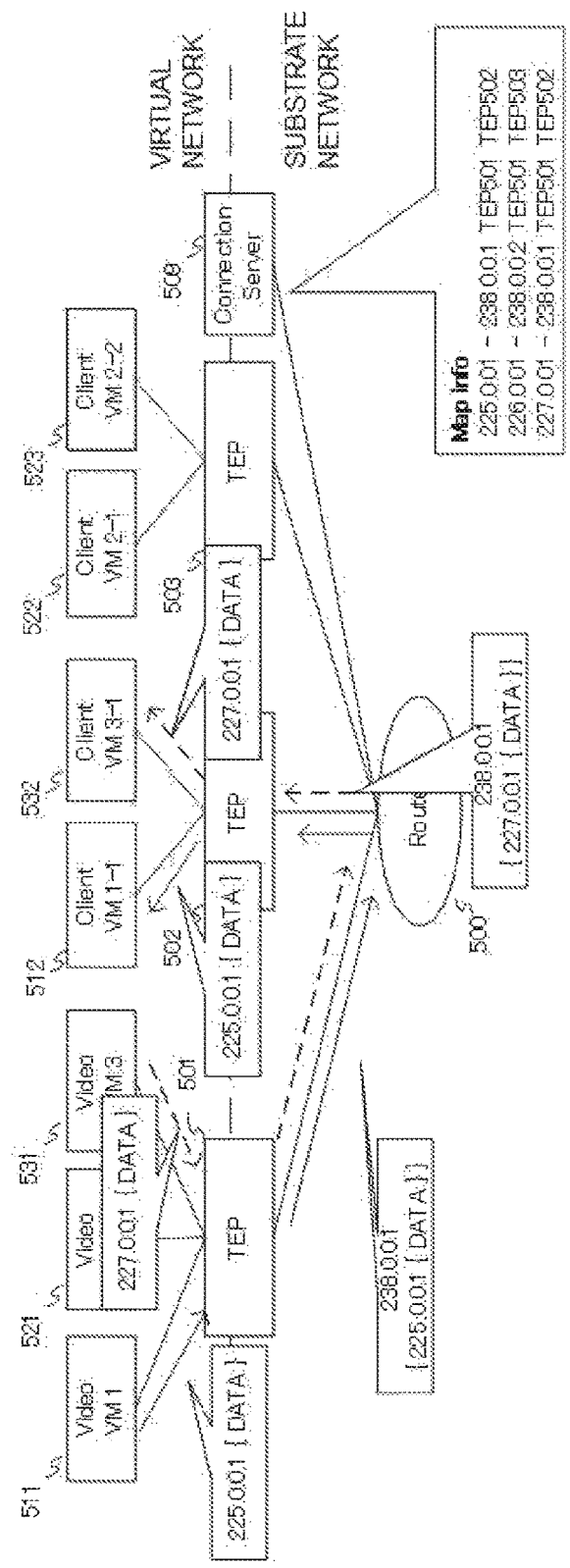
FIG. 36 illustrates a specific example of an operation of the packet forwarding apparatus according to the fourth exemplary embodiment of the present invention (forwarding of multicast data to members in different groups).
Figure 37:
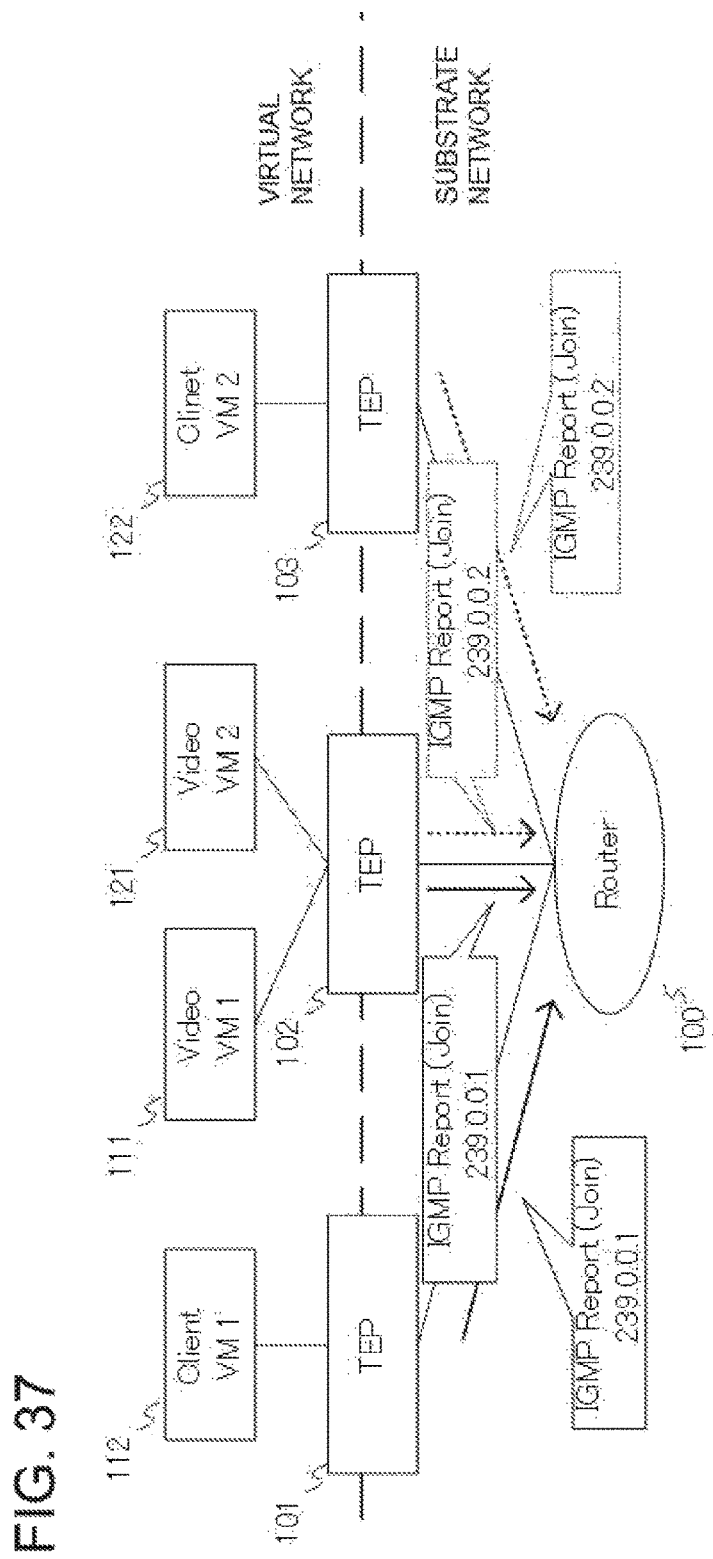
FIG. 37 illustrates multicast between virtual networks configured by using a tunneling technique.
Figure 38:
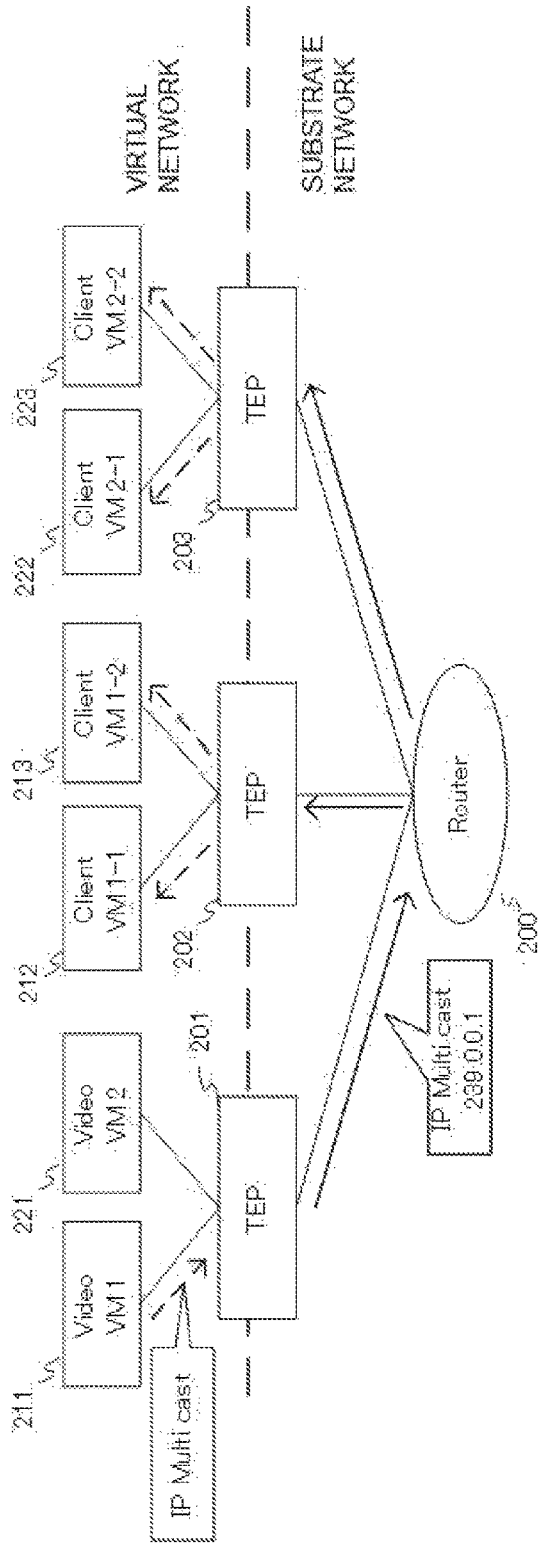
FIG. 38 is the diagram that follows FIG. 37.

As a result, as illustrated in FIG. 36, the two pieces of mapping information including 225.0.0.1 and 227.0.0.1, respectively, have the same substrate multicast address 238.0.0.1. As described above, if there are multicast communications that use different virtual-network multicast addresses and that use the same communication range, the communications can be performed by using the same substrate-network multicast address.

In FIG. 36, the clients 512 and 532 receive only the respective multicast communications. Such communication control can be realized by applying an IGMP snooping technique to the TEP apparatuses.

As described above, according to the present exemplary embodiment, as in the third exemplary embodiment, it is possible to reduce the chance of depletion of substrate multicast addresses.

Finally, in order to utilize the configurations disclosed above more efficiently, a combination with external apparatuses will be described. In IP multicast, for example, the utilization purpose of a global IP multicast address area is generally defined. When such an area is used, the impact caused by a communication with the outside could cause a problem. In such case, a multicast router may be caused to perform filtering so that only certain multicast communications are connected to an external network and multicast addresses using mapping purpose are dropped. In this way, the impact that involves external machines can be separated. Thus, it is clear that use of a global IP multicast address area for mapping purposes is not problematic.

While various exemplary embodiments of the present invention have thus been described, the present invention is not limited thereto. Further variations, substitutions, or adjustments may be made without departing from the basic technical concept of the present invention. For example, the configurations of the networks, the configurations of the elements, and the representation modes of the messages illustrated in the drawings are used merely as examples to facilitate understanding of the present invention, not to limit the present invention to the configurations illustrated in these drawings.

The above packet forwarding apparatuses 1 and 1A to 1D may be realized by OpenFlow switches in NPL 3. In this case, the functions of the above packet forwarding apparatuses 1 and 1A to 1D may be realized by causing a centralized control apparatus(es) to set control information in the packet forwarding apparatuses 1 and 1A to 1D. For example, the function of determining whether a packet(s) is a multicast packet(s) may be realized by setting a flow entry(ies) in the packet forwarding apparatuses 1 and 1A to 1D. In the flow entry(ies), a match condition(s) for determining whether a packet(s) is a multicast packet(s) is associated with an operation (instruction) performed when a packet(s) is a multicast packet(s).

In addition, each unit (processing means) in the packet forwarding apparatuses illustrated in the respective drawings may be realized by a computer program which causes a computer that constitutes an individual one of the packet forwarding apparatuses to use its hardware and perform corresponding processing described above.

Finally, suitable modes of the present invention will be summarized.

[Mode 1]
(See the packet forwarding apparatus according to the above first aspect)

[Mode 2]
The packet forwarding apparatus according to mode 1, further including:
a multicast mapping information sharing unit that notifies a different packet forwarding apparatus(es) of a content(s) of change of a piece(s) of mapping information stored in the multicast mapping information storage unit.

[Mode 3]
The packet forwarding apparatus according to mode 2, wherein, when the multicast mapping information sharing unit is notified of a content(s) of change of a piece(s) of mapping information that conflicts with a piece(s) of mapping information held in its corresponding packet forwarding apparatus from a different packet forwarding apparatus (es), the multicast mapping information sharing unit performs an arbitration operation based on a predetermined rule.

[Mode 4]
The packet forwarding apparatus according to mode 1, wherein the multicast mapping unit uses a multicast address provided from an external multicast mapping management apparatus as the second multicast address.

[Mode 5]
The packet forwarding apparatus according to mode 4, wherein the multicast mapping unit manages a member(s) in a multicast group(s) in association with the piece(s) of mapping information, and wherein, if no member exists in the group(s), the multicast mapping unit requests the multicast mapping management apparatus to delete the corresponding piece(s) of mapping information.

[Mode 6]
The packet forwarding apparatus according to any one of modes 1 to 4, wherein the multicast mapping unit manages a member(s) in a multicast group(s) in association with the piece(s) of mapping information, and wherein the packet forwarding apparatus further includes:
a mapping information integration unit that selects, from among all the pieces of mapping information, pieces of mapping information having the same members in respective multicast groups and integrates the selected pieces of mapping information so that the selected pieces of mapping information share a second multicast address.

[Mode 7]
(See the control apparatus according to the above second aspect)

[Mode 8]
(See the communication system according to the above third aspect)

[Mode 9]
(See the communication method according to the above fourth aspect)
[Mode 10]
(See the program according to the above fifth aspect)
The above Modes 7 to 10 can be expanded in the same way as mode 1 is expanded to modes 2 to 6.

The disclosure of each of the above PTL and NPLs is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 1, 1A to 1D packet forwarding apparatus
11 multicast determination unit
12, 22 multicast mapping unit
13 multicast mapping information storage unit
14 packet encapsulation unit
15 multicast mapping information sharing unit
18 virtual-network interface
19 substrate-network interface
26, 46 multicast mapping management apparatus
37 mapping information integration unit
47 mapping information integration apparatus
111, 121, 211, 221, 311, 321, 411, 421, 511, 521, 531 Video VM
112, 122, 212, 213, 222, 223, 312, 313, 322, 323, 412, 413, 422, 423, 512, 532, 522, 523 Client VM
101 to 103, 201 to 203, 301 to 303, 401 to 403, 501 to 503 TEP (apparatus)
100, 200, 300, 400, 500 router (multicast router)
409, 509 connection server (multicast mapping management apparatus)

What is claimed is:

1. A packet forwarding apparatus, comprising:
a non-transitory computer-readable data storage medium storing program code; and
a processor that is to execute the program code to:
determine whether a packet that flows through a virtual network obtained by logically dividing a substrate network is a multicast communication packet;
hold a piece of mapping information, each of which includes a first multicast address used in the virtual network obtained by logically dividing the substrate network and a second multicast address used from a multicast address usable in the substrate network, the first and second multicast addresses being associated with each other;
allocate a second multicast address to the first multicast address of a newly generated multicast communication and manages these multicast addresses as the piece of mapping information; and
encapsulate the packet that flows through the virtual network so that the encapsulated packet reaches a correspondence packet forwarding apparatus via the substrate network,
wherein the processor encapsulates the multicast communication packet that flows through the virtual network by using the second multicast address associated with the first multicast address.

2. The packet forwarding apparatus according to claim 1, wherein the processor is to execute the program code to further:
notify a different packet forwarding apparatus of a content of change of the piece of mapping information.

3. The packet forwarding apparatus according to claim 2, wherein, upon notification of a content of change of the piece of mapping information that conflicts with the piece of mapping information held in its corresponding packet forwarding apparatus from a different packet forwarding apparatus, the processor performs an arbitration operation based on a predetermined rule.

4. The packet forwarding apparatus according to claim 1, wherein the processor uses a multicast address provided from an external multicast mapping management apparatus as the second multicast address.

5. The packet forwarding apparatus according to claim 4, wherein the processor manages a member in a multicast group in association with the piece of mapping information, and
wherein, if no member exists in the group, the processor requests deletion of the corresponding piece of mapping information.

6. The packet forwarding apparatus according to claim 1, wherein the processor manages a member in a multicast group in association with the piece of mapping information, and
wherein the processor is to further execute the program code to:
select, from among all the pieces of mapping information, pieces of mapping information having the same members in respective multicast groups and integrates the selected pieces of mapping information so that the selected pieces of mapping information share a second multicast address.

7. A communication system, comprising:
a substrate network in which a router having a multicast function is arranged;
a packet forwarding apparatus comprising a processor and a non-transitory computer-readable data storage medium storing program code that the processor executes to:
determine whether a packet that flows through a virtual network obtained by logically dividing a physical network including the substrate network is a multicast communication packet;
hold a piece of mapping information, each of which includes a first multicast address used in the virtual network obtained by logically dividing the physical network and a second multicast address used from a multicast address usable in the substrate network, the first and second multicast addresses being associated with each other;
allocate a second multicast address to the first multicast address of a newly generated multicast communication and manages these multicast addresses as the piece of mapping information; and
encapsulate the packet that flows through the virtual network so that the encapsulated packet reaches a correspondence packet forwarding apparatus via the substrate network, wherein the processor encapsulates the multicast communication packet that flows through the virtual network by using a second multicast address associated with the first multicast address; and a server that provides a virtual machine that performs a communication via the substrate network and the packet forwarding apparatus.

8. The communication system according to claim 7, further comprising:

a multicast mapping management apparatus implemented at least in hardware and that manages the piece of mapping information and provides a second multicast address that corresponds to the first multicast address in response to a request.

9. The communication system according to claim 8, wherein the multicast mapping management apparatus or the packet forwarding apparatus selects, at a predetermined timing, pieces of mapping information having the same members in respective multicast groups and integrates the selected pieces of mapping information so that the selected pieces of mapping information share a second multicast address.

10. A communication method, comprising:

causing a packet forwarding apparatus that performs a communication by encapsulating a packet that flows through the virtual network obtained by logically dividing a substrate network so that the encapsulated packet reaches a correspondence packet forwarding apparatus via the substrate network to determine whether the packet that flows through the virtual network is the multicast communication packet;

causing, regarding the multicast communication in the virtual network, the packet forwarding apparatus to allocate a second multicast address used to a first multicast address used in the virtual network obtained by logically dividing the substrate network from a multicast address usable in the substrate network and manage these multicast addresses, the first and second multicast addresses that are associated with each other being held as a piece of mapping information; and causing, regarding the multicast communication in the virtual network, the packet forwarding apparatus to perform encapsulation by using the second multicast address associated with the first multicast address.

11. The packet forwarding apparatus according to claim 2, wherein the processor manages a member in a multicast group in association with the piece of mapping information, and wherein the processor further executes the program code to:

select, from among all the pieces of mapping information, pieces of mapping information having the same members in respective multicast groups and integrates the selected pieces of mapping information so that the selected pieces of mapping information share a second multicast address.

12. The packet forwarding apparatus according to claim 3, wherein the processor manages a member in a multicast group in association with the piece of mapping information, and wherein the processor further executes the program code to:

select, from among all the pieces of mapping information, pieces of mapping information having the same members in respective multicast groups and integrates the selected pieces of mapping information so that the selected pieces of mapping information share a second multicast address.

13. The packet forwarding apparatus according to claim 4, wherein the processor manages a member in a multicast group in association with the piece of mapping information, and wherein the processor further executes the program code to:

select, from among all the pieces of mapping information, pieces of mapping information having the same members in respective multicast groups and integrates the selected pieces of mapping information so that the selected pieces of mapping information share a second multicast address.

\* \* \* \* \*